US012573052B2

(12) United States Patent
Kouris et al.

(10) Patent No.: US 12,573,052 B2
(45) Date of Patent: Mar. 10, 2026

(54) METHOD AND APPARATUS FOR IMAGE SEGMENTATION

(71) Applicant: SAMSUNG ELECTRONICS CO., LTD., Suwon-si (KR)

(72) Inventors: Alexandros Kouris, Staines (GB); Stylianos I. Venieris, Staines (GB); Stefanos Laskaridis, Staines (GB); Ilias Leontiadis, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 572 days.

(21) Appl. No.: 17/888,138

(22) Filed: Aug. 15, 2022

(65) Prior Publication Data

US 2023/0128637 A1 Apr. 27, 2023

Related U.S. Application Data

(63) Continuation of application No. PCT/KR2021/016230, filed on Nov. 9, 2021.

(30) Foreign Application Priority Data

Nov. 9, 2020 (GR) ............................... 20200100671
Nov. 4, 2021 (EP) .................................... 21206453

(51) Int. Cl.
*G06T 7/12* (2017.01)
*G06V 10/70* (2022.01)
(52) U.S. Cl.
CPC ............... *G06T 7/12* (2017.01); *G06V 10/70* (2022.01); *G06T 2207/20081* (2013.01)

(58) Field of Classification Search
CPC .. G06T 7/12; G06T 2207/20081; G06V 10/70
See application file for complete search history.

(56) References Cited

U.S. PATENT DOCUMENTS 9,984,471 B2 5/2018 Becker et al.
10,460,175 B1 10/2019 Gould et al.
(Continued)

FOREIGN PATENT DOCUMENTS

CN 109191392 A 1/2019
CN 110276795 A * 9/2019 ............. G06T 7/557
(Continued)

OTHER PUBLICATIONS

Junguang et al., Resource Efficient Domain Adaptation , Oct. 2020, ACM Deep Learning for Multimedia (Year: 2020).*
(Continued)

*Primary Examiner* — Wednel Cadeau
(74) *Attorney, Agent, or Firm* — Sughrue Mion, PLLC

(57) ABSTRACT

Broadly speaking, the present techniques generally relate to a method for training a machine learning, ML, model to perform semantic image segmentation, and to a computer-implemented method and apparatus for performing semantic image segmentation using a trained machine learning, ML, model. The training method enables a semantic image segmentation ML model that is able to make predictions faster, without significant loss in accuracy. The training method also enables the ML model to be implemented on apparatus with different hardware specifications, i.e. different computational power and memory, for example.

17 Claims, 16 Drawing Sheets

Training (by server)

Provide backbone feature extraction network with a plurality of early exits, to generate an overprovisioned network comprising a plurality of candidate early exit segmentation network architectures S100

Obtain training dataset comprising plurality of images S102

Train backbone network and early exits end-to-end S104

Freeze weights of backbone network and final early exit S106

Train all remaining early exits individually using final early exit as a teacher S108

(56) References Cited

U.S. PATENT DOCUMENTS

| | | | |
|---|---|---|---|
| 2019/0180168 A1 | 6/2019 | Barad et al. | |
| 2019/0266236 A1 | 8/2019 | Battach et al. | |
| 2019/0362269 A1 | 11/2019 | Barad | |
| 2020/0234447 A1 | 7/2020 | Karmatha et al. | |
| 2021/0012194 A1 | 1/2021 | Laskaridis et al. | |
| 2022/0067453 A1* | 3/2022 | Farhadi | G06V 10/82 |

FOREIGN PATENT DOCUMENTS

| | | |
|---|---|---|
| CN | 111445026 A | 7/2020 |
| EP | 3 686 805 A1 | 7/2020 |
| KR | 10-2020-0131425 A | 11/2020 |

OTHER PUBLICATIONS

1. Junguang et al., Resource Efficient Domain Adaptation , Oct. 2020, ACM Deep Learning for Multimedia (Year: 2020).*

Seungyeop Han et al., "MCDNN: An Approximation-Based Execution Framework for Deep Stream Processing Under Resource Constraints", ACM, Proceedings of the 14th Annual International Conference on Mobile Systems, Applications, and Services (MobiSys), DOI: http://dx.doi.org/10.1145/2906388.2906396, 2016, 14 pages total.

Daniel Kang et al., "NoScope: Optimizing Neural Network Queries over Video at Scale", Proceedings of the VLDB Endowment, vol. 10, No. 11, 2017, 12 pages total.

Kevin Hsieh et al., "Focus: Querying Large Video Datasets with Low Latency and Low Cost", Proceedings of the 13th USENIX Symposium on Operating Systems Design and Implementation, Oct. 2018, 19 pages total.

Alexandros Kouris et al., "CascadeCNN: Pushing the Performance Limits of Quantisation in Convolutional Neural Networks", 2018 28th International Conference on Field-Programmable Logic and Applications, IEEE, 2018, 8 pages total.

Ben Taylor, Vicent Sanz Marco, Willy Wolff, Yehia Elkhatib, and Zheng Wang, "Adaptive Deep Learning Model Selection on Embedded Systems", Proceedings of the 19th ACM SIGPLAN/SIGBED International Conference on Languages, Compilers, and Tools for Embedded Systems (LCTES), 2018, 12 pages total.

Surat Teerapittayanon et al., "BranchyNet: Fast Inference via Early Exiting from Deep Neural Networks", 2016 23rd International Conference on Pattern Recognition (ICPR), IEEE, 2016, 6 pages total.

Surat Teerapittayanon et al., "Distributed Deep Neural Networks over the Cloud, the Edge and End Devices", 2017 IEEE 37th International Conference on Distributed Computing Systems (ICDCS), 2017, 12 pages total.

Gao Huang et al., "Multi-Scale Dense Convolutional Networks for Efficient Prediction", arXiv:1703.09844v1, ResearchGate, International Conference on Learning Representations (ICLR), Mar. 2017, 12 pages total.

Yigitcan Kaya et al., "Shallow-Deep Networks: Understanding and Mitigating Network Overthinking", Proceedings of the 36th International Conference on Machine Learning (ICML), 2019, 10 pages total.

Linfeng Zhang et al., "SCAN: A Scalable Neural Networks Framework Towards Compact and Efficient Models", arXiv:1906.03951v1, Advances in Neural Information Processing Systems (NeurIPS), May 2019, 10 pages total.

Ji Xin et al., "DeeBERT: Dynamic Early Exiting for Accelerating BERT Inference", arXiv:2004.12993v1, Proceedings of the 58th Annual Meeting of the Association for Computational Linguistics (ACL), Association for Computational Linguistics, Apr. 2020, 6 pages total.

Stefanos Laskaridis et al., "HAPI: Hardware-Aware Progressive Inference", arXiv:2008.03997v1, 39th International Conference on Computer-Aided Design (ICCAD), 2020, 9 pages total.

Stefanos Laskaridis et al., "SPINN: Synergistic Progressive Inference of Neural Networks over Device and Cloud", 26th Annual International Conference on Mobile Computing and Networking (MobiCom), 2020, 15 pages total.

Zhihang Yuan et al., "S2DNAS: Transforming Static CNN Model for Dynamic Inference via Neural Architecture Search", arXiv:1911.07033v2, European Conference on Computer Vision (ECCV), Dec. 2019, 12 pages total.

Xiaoxiao Li et al., "Not All Pixels Are Equal: Difficulty-Aware Semantic Segmentation via Deep Layer Cascade", CVF, Computer Vision Foundation, Proceedings of the IEEE/CVF Conference on Computer Vision and Pattern Recognition (CVPR), 2017, 10 pages total.

Yanwei Li et al., "Learning Dynamic Routing for Semantic Segmentation", CVF, Computer Vision Foundation, Proceedings of the IEEE/CVF Conference on Computer Vision and Pattern Recognition (CVPR), 2020, 10 pages total.

Jonathan Long et al., "Fully Convolutional Networks for Semantic Segmentation", CVF, Computer Vision Foundation, IEEE Transactions on Pattern Analysis and Machine Intelligence (TPAMI), 2015, 10 pages total.

Liang-Chieh Chen et al., "DeepLab: Semantic Image Segmentation with Deep Convolutional Nets, Atrous Convolution, and Fully Connected CRFs", arXiv:1606.00915v2, IEEE Transactions on Pattern Analysis and Machine Intelligence (TPAMI), May 2017, 14 pages total.

Olaf Ronneberger et al., "U-Net: Convolutional Networks for Biomedical Image Segmentation", International Conference on Medical Image Computing and Computer-Assisted Intervention (MICCAI), DOI: 10.1007/978-3-319-24574-4_28, 2015, 8 pages total.

"Early Exit Inference", Intel Nervana, Retrieved: Sep. 2020, 4 pages total, https://nervanasystems.github.io/distiller/algo_earlyexit.html.

Eduardo Romera et al., "ERFNet: Efficient Residual Factorized ConvNet for Real-time Semantic Segmentation", IEEE Transactions on Intelligent Transportation Systems, 19, 1, 2017, 10 pages total.

Sachin Mehta et al., "ESPNet: Efficient Spatial Pyramid of Dilated Convolutions for Semantic Segmentation", CVF, Computer Vision Foundation, Proceedings of the european conference on computer vision (ECCV), 2018, 17 pages total.

Lane McIntosh et al., "Recurrent Segmentation for Variable Computational Budgets", CVF, Computer Vision Foundation, Proceedings of the IEEE Conference on Computer Vision and Pattern Recognition Workshops (CVPRW), 2018, 10 pages total.

Simone Scardapane et al., "Why should we add early exits to neural networks?", arXiv:2004.12814v2, Cognitive Computation, Jun. 2020, 24 pages total.

Sauptik Dhar et al., "On-Device Machine Learning: An Algorithms and Learning Theory Perspective", arXiv:1911.00623v2, Association for Computing Machinery, Jul. 2020, 46 pages total.

Junguang Jiang et al., "Resource Efficient Domain Adaptation", Proceedings of the 28th ACM International Conference on Multimedia, DOI: 10.1145/3394171.3413701, Oct. 2020, 9 pages total, XP058478351.

Hao Li et al., "Improved Techniques for Training Adaptive Deep Networks", IEEE, 2019 IEEE/CVF International Conference on Computer Vision (ICCV), DOI: 10.1109/ICCV.2019.00198, 2019, 10 pages total, XP033723606.

Linfeng Zhang et al., "Be Your Own Teacher: Improve the Performance of Convolutional Neural Networks via Self Distillation", IEEE, 2019 IEEE/CVF International Conference on Computer Vision (ICCV), DOI: 10.1109/ICCV.2019.00381, 2019, 10 pages total, XP033723287.

Mary Phuong et al., "Distillation-Based Training for Multi-Exit Architectures", IEEE, 2019 IEEE/CVF International Conference on Computer Vision (ICCV), DOI: 10.1109/ICCV.2019.00144, 2019, 10 pages total, XP033723595.

Jianping Gou et al., "Knowledge Distillation: A Survey", arxiv.org, Oct. 2020, 34 pages total, XP081795698.

"Grayskull", Tenstorrent, Tenstorrent's Grayskull AI Chip, Retrieved: Sep. 2020, 7 pages total, https://tenstorrent.com/grayskull/.

International Search Report dated Feb. 21, 2022 issued by the International Searching Authority in counterpart International Application No. PCT/KR2021/016230 (PCT/ISA/210).

(56)                    References Cited

OTHER PUBLICATIONS

International Written Opinion dated Feb. 21, 2022 issued by the International Searching Authority in counterpart International Application No. PCT/KR2021/016230 (PCT/ISA/237).
Communication dated Mar. 30, 2022 issued by the European Patent Office in counterpart European Application No. 21206453.9.
Communication dated Jun. 30, 2022 issued by the European Patent Office in counterpart European Application No. 21206453.9.
European Extended Search Report issued Feb. 16, 2024 by the European Patent Office for EP Patent Application No. 23210143.6.
Communication dated Feb. 24, 2025, issued by the European Patent Office in European Patent Application No. 23210143.6.
He et al., "Visual SLAM algorithm based on instance segmentation", Computer Engineering and Design, Oct. 2020, 6 total pages, vol. 41, doi:10.16208/j.issn1000-7024.2020.10.016.
Office Action dated Dec. 23, 2025, issued by Chinese Patent Office in Chinese Patent Application No. 202180075275.X.

* cited by examiner

FIG. 5A
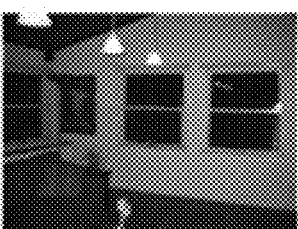 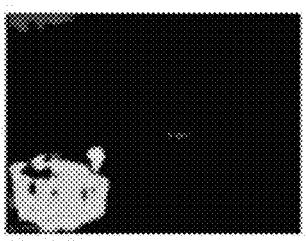 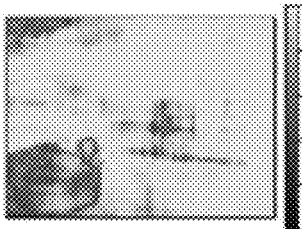
Input image     Segmentation     Per-pixel
                prediction       confidence

FIG. 5B
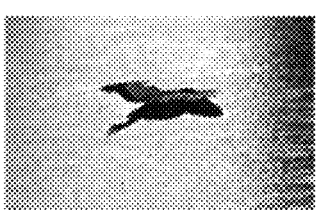
Input image
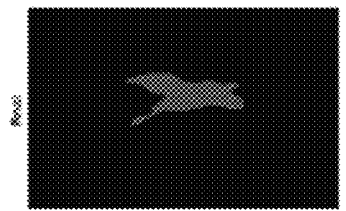
Segmentation
prediction
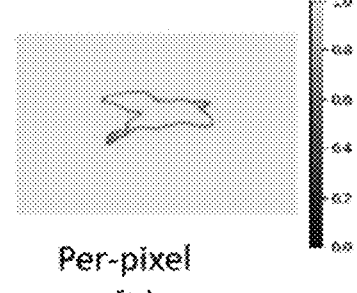
Per-pixel
confidence

FIG. 6A
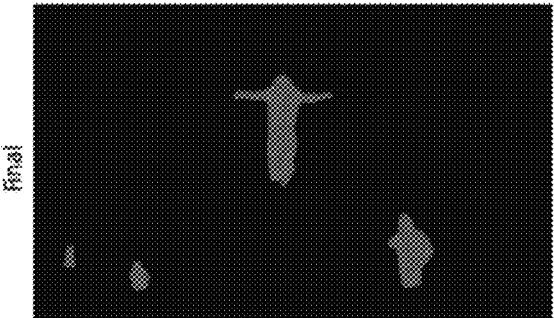

FIG. 8

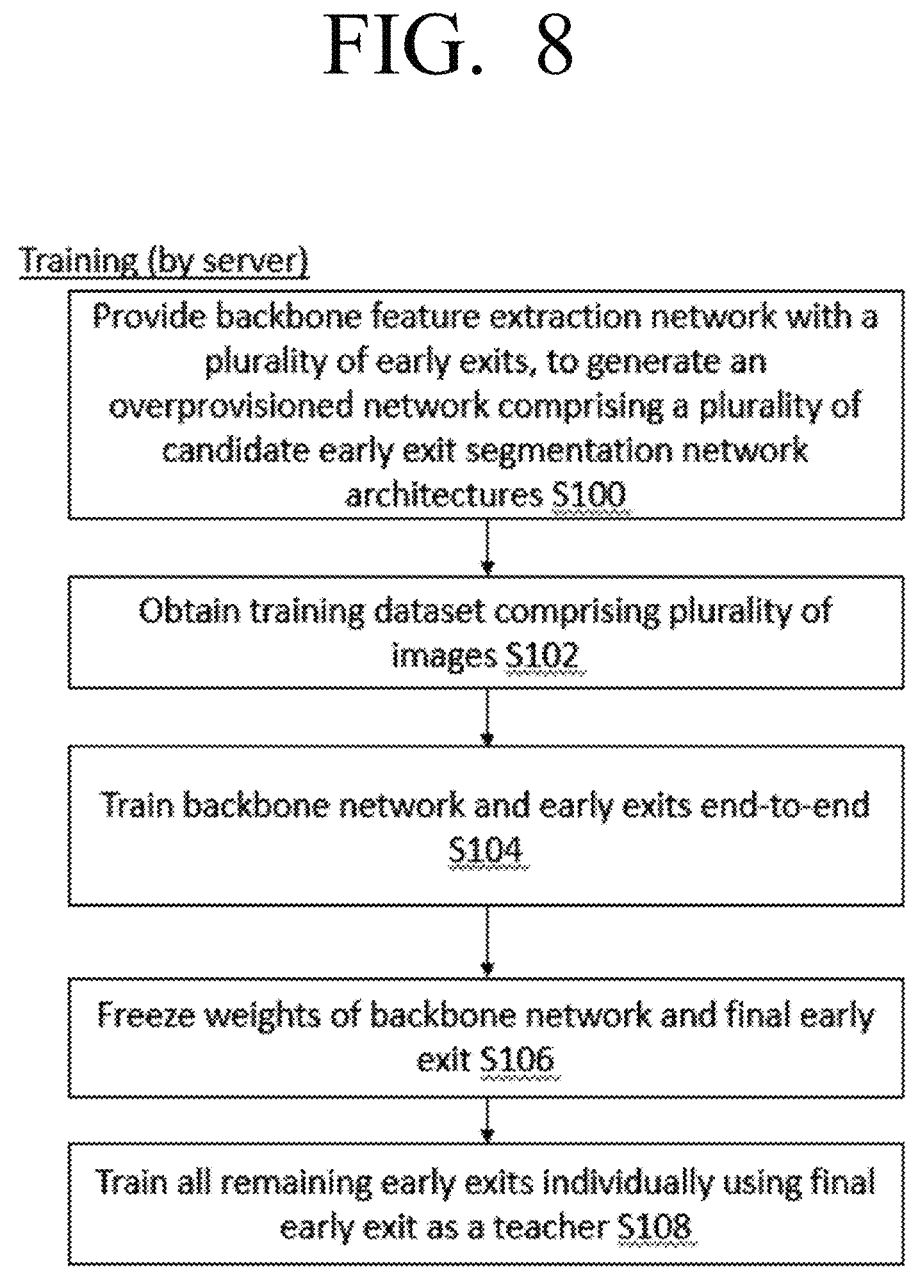

Training (by server)

Provide backbone feature extraction network with a plurality of early exits, to generate an overprovisioned network comprising a plurality of candidate early exit segmentation network architectures S100

Obtain training dataset comprising plurality of images S102

Train backbone network and early exits end-to-end S104

Freeze weights of backbone network and final early exit S106

Train all remaining early exits individually using final early exit as a teacher S108

FIG. 9

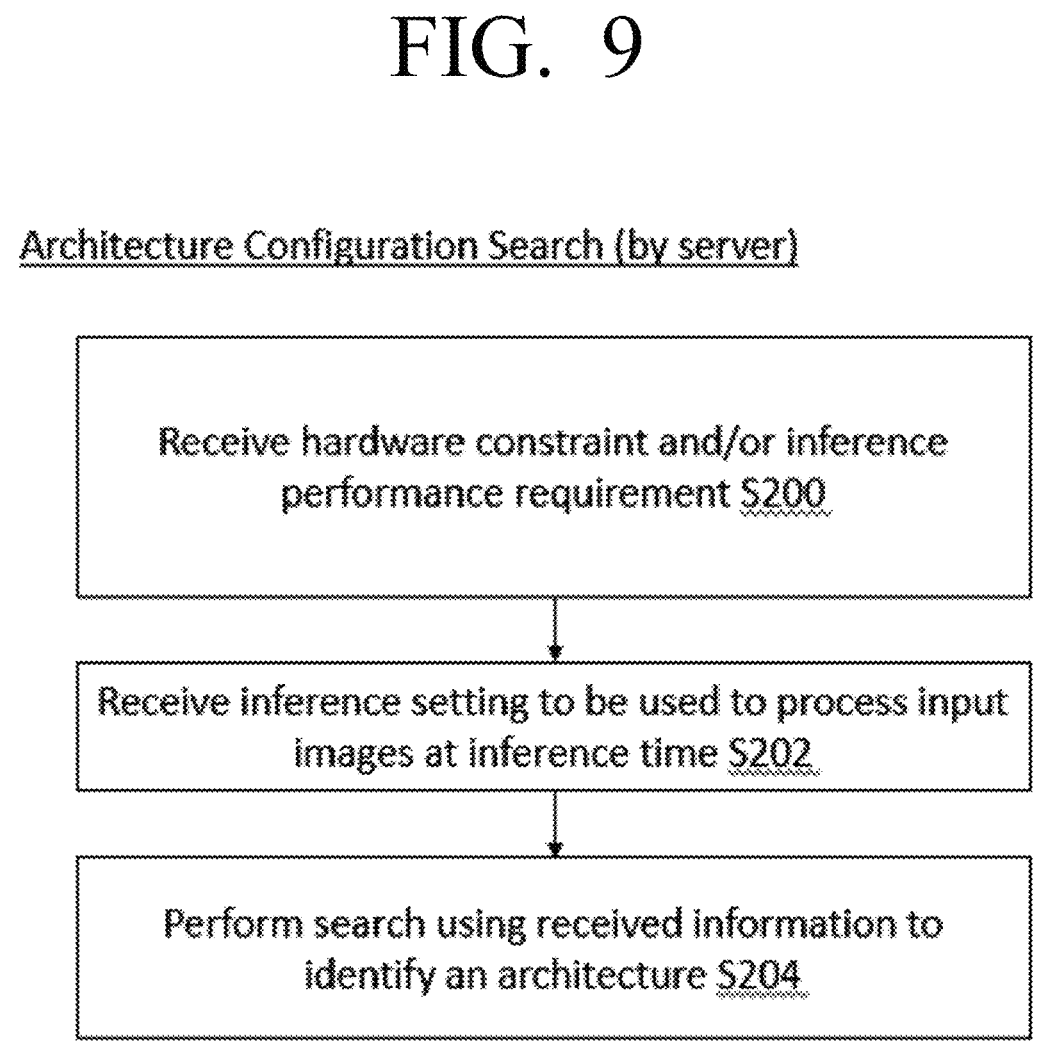

Architecture Configuration Search (by server)

Receive hardware constraint and/or inference performance requirement S200

Receive inference setting to be used to process input images at inference time S202

Perform search using received information to identify an architecture S204

FIG. 10

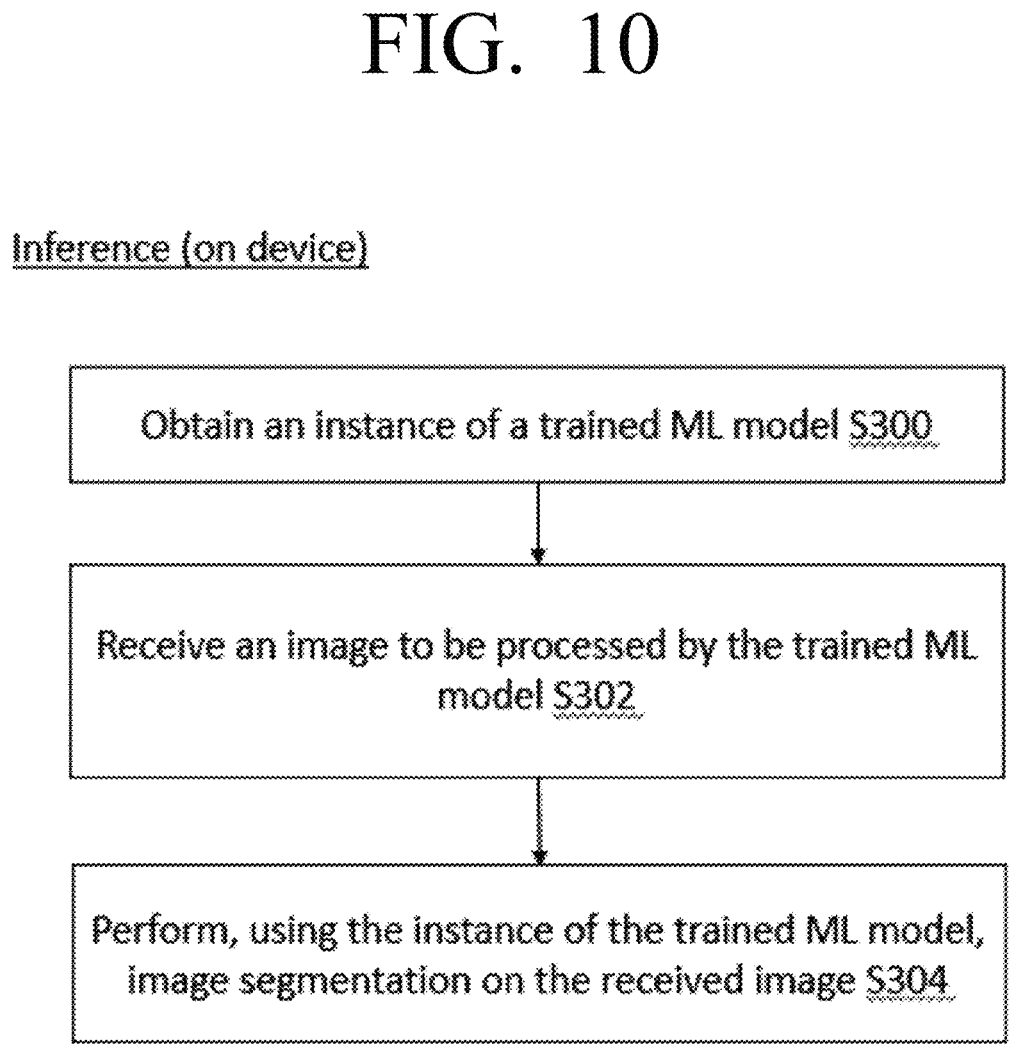

Inference (on device)

Obtain an instance of a trained ML model S300

Receive an image to be processed by the trained ML model S302

Perform, using the instance of the trained ML model, image segmentation on the received image S304

METHOD AND APPARATUS FOR IMAGE SEGMENTATION

CROSS-REFERENCE TO RELATED APPLICATION(S)

This application is a bypass continuation of International Application No. PCT/KR2021/016230, filed on Nov. 9, 2021, which is based on and claims priority to Greek Patent Application No. 20200100671, filed on Nov. 9, 2020, in the Greek Patent Office, and European Patent Application No. EP21206453.9, filed on Nov. 4, 2021, in the European Property Office, the disclosures of which are incorporated by reference herein in their entireties.

BACKGROUND

Field

The present application generally relates to a method for generating a machine learning, ML, model to perform semantic image segmentation, and to a computer-implemented method for performing semantic image segmentation using a trained machine learning, ML, model.

Description of Related Art

Semantic segmentation constitutes a core machine vision task that has demonstrated tremendous advancement due to the emergence of deep learning. Semantic image segmentation networks tackle the finest-grained visual scene understanding tasks by predicting dense (every pixel) semantic labels for an image of arbitrary resolution. These dense semantic predictions can facilitate various applications related to mobile Augmented Reality/Virtual Reality (ARNR) applications, autonomous robots, navigation, semantic mapping, telepresence agents, efficient video communications, etc. Quality-of-service and safety are of utmost importance when deploying such real-time systems, which often run on resource-constrained platforms such as smartphones, consumer robotic devices and autonomous vehicles. Thus, efficient and accurate segmentation is a core problem that requires solving.

Current techniques for semantic segmentation typically comprise computation- and memory-intensive deep learning models, that frequently fail to meet application real-time requirements on latency when deployed on consumer devices (such as smartphones).

Particularly, the every-pixel nature of the segmentation output calls for high-resolution feature maps to be preserved throughout the underlying neural network (to avoid the eradication of spatial information), while also maintaining a large receptive field on the output (to incorporate context and achieve robust semantic predictions). Thus, the resulting network architectures typically consist of numerous layers and frequently replace feature-volume downsampling with dilated convolutions of increasing rate, leading to significant workload concentration deeper in the network, which, in turn, results in latency-intensive inference. The situation is further aggravated in the case of mid and low tier devices, which tend to have less processing power and memory than top tier devices. It is therefore desirable to reduce inference latency. Reducing inference latency may also improve the user experience through smooth and seamless interaction, improve functionality by making space for other tasks to run on the shared resources of the device, and improve safety when semantic segmentation predictions contribute towards real-time mission-critical decision making (e.g. in autonomous vehicles). However, current approaches for reducing inference latency include efficient handcrafted model designs, and adaptive computation models. For coarser image classification tasks, this challenge is effectively tackled through cascade systems and early-exit architectures. Semantic segmentation networks though, demonstrate unique challenges in the adoption of such methodologies.

SUMMARY

The present applicant has recognised the need for an improved semantic image segmentation network or ML model that are able to make predictions faster, without significant loss in accuracy.

Semantic segmentation arises as the backbone of many vision systems, spanning from self-driving cars and robot navigation to augmented reality and teleconferencing. Frequently operating under stringent latency constraints within a limited resource envelope, optimising for efficient execution becomes important. To this end, the present techniques provide a framework for converting state-of-the-art segmentation models to MESS networks, i.e. specially trained convolutional neural networks (CNNs) that employ parametrised early exits along their depth to save computation during inference on easier samples. Designing and training such networks naively can hurt performance. Thus, the present techniques provide a two-staged training process that pushes semantically important features early in the network. The number, placement and architecture of the attached segmentation heads are co-optimised, along with the exit policy, to adapt to the device capabilities and application-specific requirements. Optimising for speed, MESS networks can achieve latency gains of up to 2.83× over state-of-the-art methods with no accuracy degradation. Accordingly, optimising for accuracy, the present techniques achieve an improvement of up to 5.33 percentage points under the same computational budget.

In a first approach of the present techniques, there is provided a computer-implemented method for generating a machine learning, ML, model for semantic image segmentation, the method comprising: providing a backbone feature extraction network of the ML model with a plurality of early exits in the backbone network, to generate an overprovisioned network comprising a plurality of candidate early exit segmentation network architectures, wherein each early exit comprises a tailored network architecture; obtaining a training dataset comprising a plurality of images; and training the backbone network of the ML model, a final exit and the early exits to output feature maps for the plurality of images input into the backbone network, by: training, during a first training stage, the final exit and the backbone network and the early exits end-to-end; and freezing weights of the backbone network and the final exit, after the end-to-end training is complete, and training, during a second training stage, the early exits individually using the final exit as a teacher for the remaining early exits.

Preferably, each early exit comprises a "segmentation head". The segmentation head has a neural network architecture may be, for example, a Fully Convolutional Network-based head (FCN-Head), or a DeepLabV3-based head (DLB-Head). Thus, each segmentation head comprises a neural network for providing an image segmentation prediction. Each early exit/segmentation head comprises a tailored network architecture. That is, each early exit in a candidate early exit architecture may have the same network architecture or may be different or may have a network architecture chosen from a set of possible network architectures. This means that the early exit network architectures are not necessarily uniform across a particular candidate early exit segmentation network architecture. This is advantageous because shallow exits benefit from network architectures having numerous lightweight layers, whereas deeper exits favour channel-rich network architectures, and thus allowing for non-uniform early exit network architectures enables customisation of the ML model for different devices, different inference settings, and different user inference requirements.

In other words, the present techniques provide a method for training a ML model which has the form of a multi-exit semantic segmentation network (or progressive segmentation network). The network comprises numerous early-exit points (i.e. segmentation heads) attached to different depths of a backbone convolutional neural network (CNN) architecture. This offers segmentation predictions with varying workload (and accuracy) characteristics, introducing a "train-once-deploy-everywhere" approach for efficient semantic segmentation. Advantageously, this means that the network can be parametrised without the need to retrain in order to be deployed across heterogeneous target devices of varying capabilities (low to high end).

This is enabled by the following two processes. Firstly, the present techniques comprise a two-stage training scheme tailored for Multi-Exit Semantic Segmentation networks. At the first stage, a novel Regularised End-to-End training algorithm is introduced, where both a backbone architecture of the network and all exit points (i.e. the final exit point and any early exit points) are trained together, and where the early exits are sequentially dropped in each training epoch in a round-robin fashion. (That is, the backbone and a single early exit is trained by sequentially dropping an early exit during each training epoch. The process is repeated for every combination of backbone and single early exit). The first stage fully trains the weights of the backbone network and final exit in an exit-aware manner, and at the same time, initialises the weights of the early-exits, to be fine-tuned in at the next stage. At the second stage, the backbone and final exit are frozen (i.e. the backbone's weights and the final exit's weights are not updated) and the early exits are trained independently. This stage employs a novel knowledge distillation methodology, that quantifies the difficulty of classifying each pixel (considering the final exit's predictions correctness), and distils using only the samples that are correctly classified by the final exit. This two-stage scheme enables reaching high accuracy both on shallow exits and the final exit.

The first training stage may comprise: iteratively training the backbone network and early exits, wherein during each iteration the training comprises: selecting one early exit of the plurality of early exits to be updated; dropping-out an early exit of the remainder of the early exits; and training the backbone network and the selected early exit and updating weights of the backbone network and selected early exit.

Preferably, for each selected early exit, the remainder of the early exits are sequentially dropped-out during each iteration of training the selected early exit.

The second training stage may comprise: determining, using a segmentation prediction made for an image by the final exit, a difficulty of each pixel in the image based on whether the prediction for each pixel is correct; and training the early exits using only the pixels for which the prediction is correct. That is, the present techniques provide a positive filtering distillation technique, which selectively controls the flow of information to earlier exits using only signals from samples about which the last exit is correct. The proposed distillation scheme evaluates the difficulty of each pixel in the input sample with respect to the correctness of the teacher's prediction (i.e. final output). Subsequently, the stronger (higher entropy) ground-truth reference signal fed to early exits is filtered, allowing only information for "easy" pixels to pass through. Thus, the training efforts and the learning capacity of each exit are concentrated to "easier" pixels, by avoiding the pollution of the training algorithm with noisy gradients from contradicting loss terms.

The method for generating a ML model may further comprise performing architecture configuration search to identify an architecture from the plurality of candidate early exit segmentation network architectures that is suitable for a particular application.

The method may further comprise: receiving a hardware constraint and/or an inference performance requirement; receiving an inference setting for a specific device or class of devices which will be used to process input images at inference time; and performing the architecture configuration search using the received hardware constraint and/or inference performance requirement, and the received inference setting.

Thus, this advantageously enables a suitable early exit segmentation network architecture to be identified from all the possible candidates which will be suitable to run on a device having particular hardware constraints. Since the present techniques provide a "train-once-deploy-everywhere" method, the trained network can be parameterised without the need to retrain in order to be deployed on devices with hardware constraints and/or different inference-time performance requirements, which may be set by a user or may be application-specific. For example, semantic image segmentation may need be performed quickly and with high accuracy for autonomous vehicles where safety is critical, but slower processing and/or lower accuracy may be acceptable for other use-cases/applications.

The at least one hardware constraint may be at least one of: a computational load of the device, a memory capacity of the device, and power consumption of the device.

The method may further comprise sending or transmitting or otherwise making available the identified and extracted early exit segmentation network architecture to a device having the same hardware constraints and/or an inference performance requirement, and using the same inference setting.

The received inference setting may be a budgeted inference setting. In this case, the architecture configuration search outputs an architecture which comprises a backbone feature extraction network and a single early exit. At inference time, all samples are processed by this architecture, meeting workload, memory, size, etc requirements deterministically.

The inference performance requirement may any one of: a required confidence level, a minimum required accuracy, a latency limit per image, a latency limit for a set of images, and an inference time limit.

The received inference setting may be an anytime inference setting. In this case, the architecture configuration search outputs an architecture which comprises a backbone feature extraction network and multiple early exits. At inference time, samples are processed by each of the selected early-exits sequentially, where each early exit provides a segmentation prediction that is progressively refined/improved over time. Other components of the system, or the user, can benefit from early predictions at runtime.

When the received inference setting is an input-dependent inference setting, the architecture configuration search outputs an architecture which comprises a backbone feature extraction network and multiple early exits, wherein the architecture comprises a confidence evaluation unit associated with each early exit to evaluate, at inference time, a confidence of a prediction made by each early exit. In this case, the exits process each sample sequentially, and after each prediction, the confidence evaluation unit will determine whether the current image requires further processing (by subsequent exits), or can terminate its computation, already offering a confident-enough prediction, at image level (not per-pixel). Confidence tries to capture the notion of difficulty for an image to be segmented, allowing easy samples to exit-early, spending the "right amount of computation" on each input sample, at runtime.

The confidence evaluation unit for each early exit may be configured to: calculate a confidence value of the image segmentation prediction made by the associated early exit for the image as a whole; determine whether the confidence value is greater than or equal to a threshold confidence value; and instruct the processing to continue to a subsequent early exit when the confidence value is below the threshold confidence value, or instruct the processing to terminate when the confidence value is greater than or equal to the threshold confidence value.

Calculating a confidence value for the image as a whole may comprise: obtaining a per-pixel confidence map comprising confidence values for each pixel of the image; identifying pixels located close to semantic edges of objects within the prediction; and outputting a percentage value of pixels in the image which have a per-pixel confidence value greater than or equal to the threshold confidence values, wherein contributions of the identified pixels are downgraded. The threshold confidence value may be optimised for each early exit during the architecture configuration search, along with the number, placement and configuration (architecture) of the early exits.

Thus, the present techniques comprise an input-dependent inference method for Multi-Exit Semantic Segmentation networks. This employs a novel mechanism to estimate the prediction confidence in segmentation tasks, i.e. dense per-pixel classification rather than per-image classification. This involves using the percentage of pixels whose prediction confidence surpasses a given confidence threshold value. Furthermore, pixels that are closer to semantic edges of objects are reweighted to downgrade their contribution, based on the observation that their confidence tends to be lower. Thus, the present techniques provide a robust estimation of confidence for a segmentation prediction that is not affected by extremely under-confident pixels/areas of the image. This input-dependent inference method is used to estimate the prediction confidence of each exit, enabling early-exiting for "easy" inputs with the corresponding performance gain.

In a second approach of the present techniques, there is provided a computer-implemented method for using a trained machine learning, ML, model for semantic image segmentation on a device, the method comprising: obtaining an instance of a trained ML model, the instance being an early exit segmentation network architecture associated with the device or a class of devices to which the device belongs and suitable for an inference setting used by the device; receiving an image to be processed by the instance of the trained ML model; and performing, using the instance of the trained ML model, image segmentation on the received image. It will be understood that the term "obtaining" may mean that the instance of the trained ML model is obtained from a server, which may occur once. It will be understood that the term "obtaining" may mean that the instance of the trained ML model is obtained from memory or local storage on the device for use each time image segmentation is to be performed.

When the early exit segmentation network architecture comprises a backbone feature extraction network and a single early exit, performing image segmentation may comprise outputting an image segmentation prediction from the single early exit.

When the early exit segmentation network architecture comprises a backbone feature extraction network and multiple early exits, performing image segmentation may comprise sequentially processing the image by the early exits. As noted above, the network architecture of each early exit may be the same or different (i.e. non-uniform). After processing by an early exit, the method may comprise: providing an image segmentation prediction from the early exit; calculating a confidence value of the image segmentation prediction for the image as a whole; determining whether the confidence value is greater than or equal to a threshold confidence value; and processing the image using a subsequent early exit when the confidence value is below the threshold confidence value; or outputting the image segmentation prediction from the early exit when the confidence value is greater than or equal to the threshold confidence value. The confidence value for the image as a whole may be determined by considering a percentage of pixels in an image with a pixel-level confidence above the threshold confidence value. Thus, the number of pixels with a confidence above the threshold confidence value is determined out of the total number of pixels in the image, and this percentage is used to determine whether the threshold confidence value has been satisfied by the whole image.

When the early exit segmentation network architecture comprises a backbone feature extraction network, multiple early exits, and a confidence evaluation unit associated with each early exit, wherein the confidence evaluation unit for each early exit is configured to: obtain a per-pixel confidence map comprising confidence values for each pixel of the image; identify pixels located close to semantic edges of objects within the prediction; and generate a confidence value for the image as a whole, wherein the confidence value is a percentage value of pixels in the image which have a per-pixel confidence value greater than or equal to a threshold confidence value associated with the early exit, wherein contributions of the identified pixels are downgraded.

In a third approach of the present techniques, there is provided an apparatus for performing semantic image segmentation using a trained machine learning, ML, model, the apparatus comprising: at least one processor coupled to memory and arranged to: obtaining an instance of a trained ML model, the instance being an early exit segmentation network architecture associated with the apparatus or a class of apparatuses to which the apparatus belongs; receive an image to be processed by the trained ML model; and performing, using the instance of the trained ML model, image segmentation on the received image.

The features described above with the second approach apply equally to the third approach.

The apparatus may further comprise at least one image capture device for capturing images or videos to be processed by the ML model.

The apparatus may further comprise at least one interface for providing a result of the processing by the ML model to a user of the apparatus.

The apparatus may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

In a fourth approach of the present techniques, there is provided a server for generating a machine learning, ML, model for semantic image segmentation, the server comprising: at least one processor coupled to memory and arranged to: provide a backbone feature extraction network of the ML model with a plurality of early exits in the backbone network, to generate an overprovisioned network comprising a plurality of candidate early exit segmentation network architectures; obtain a training dataset comprising a plurality of images; and train the backbone network of the ML model and the early exits to output feature maps for the plurality of images input into the backbone network, by: training the backbone network and the early exits end-to-end; and freezing weights of the backbone network and a final early exit, after the end-to-end training is complete, and training all remaining early exits individually using the final early exit as a teacher for the remaining early exits.

The features described above with respect to the first approach apply equally to the fourth approach.

In a related approach of the present techniques, there is provided a non-transitory data carrier carrying processor control code to implement the methods described herein. That is, there is provided a computer-readable storage medium comprising instructions which, when executed by a computer, cause the computer to carry out the steps of the method described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual process- ing unit (VPU), and/or an AI-dedicated processor such as a neural processing unit (NPU). The one or a plurality of processors control the processing of the input data in accor- dance with a predefined operating rule or artificial intelli- gence (AI) model stored in the non-volatile memory and the volatile memory. The predefined operating rule or artificial intelligence model is provided through training or learning. Here, being provided through learning means that, by apply- ing a learning algorithm to a plurality of learning data, a predefined operating rule or AI model of a desired charac- teristic is made. The learning may be performed in a device itself in which AI according to an embodiment is performed, and/o may be implemented through a separate server/sys- tem.

The AI model may consist of a plurality of neural network layers. Each layer has a plurality of weight values, and performs a layer operation through calculation of a previous layer and an operation of a plurality of weights. Examples of neural networks include, but are not limited to, convolu- tional neural network (CNN), deep neural network (DNN), recurrent neural network (RNN), restricted Boltzmann Machine (RBM), deep belief network (DBN), bidirectional recurrent deep neural network (BRDNN), generative adver- sarial networks (GAN), and deep Q-networks.

The learning algorithm is a method for training a prede- termined target device (for example, a robot) using a plu- rality of learning data to cause, allow, or control the target device to make a determination or prediction. Examples of learning algorithms include, but are not limited to, super- vised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIGS. 5A and 5B show two example input images that have been processed using the semantic segmentation model during training of the model;

FIG. 6A shows an example input image and two predic- tions made using a final exit point and an early exit point of the model;

FIG. 8 shows a flowchart of example steps to generate a semantic segmentation model, and specifically, to train an overprovisioned network comprising a plurality of candidate early exit segmentation network architectures;

FIG. 9 shows a flowchart of example steps to generate a sematic segmentation model, and specifically, to search for a specific candidate architecture;

FIG. 10 shows a flowchart of example steps to use a trained model to make semantic segmentation predictions;

DETAILED DESCRIPTION

Figure 1:
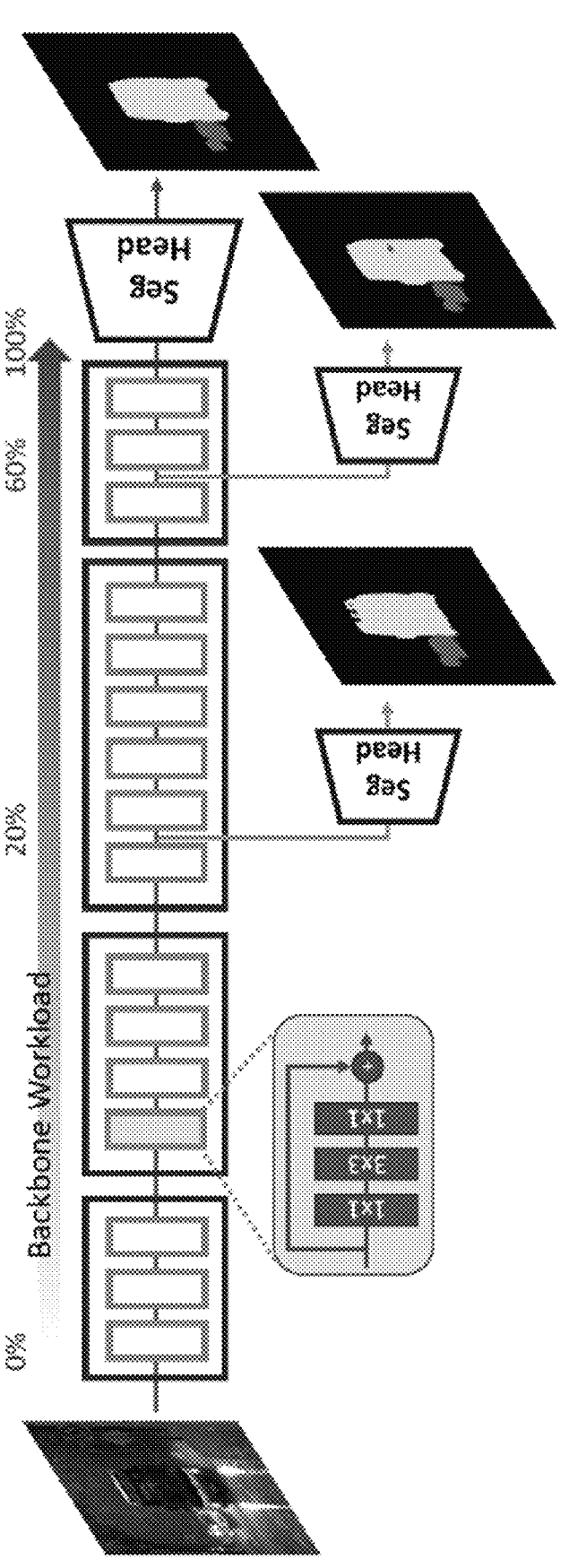
FIG. 1 is a schematic diagram illustrating an instance of a multi-exit semantic image segmentation model.

Broadly speaking, the present techniques generally relate to a method and server for generating a machine learning, ML, model to perform semantic image segmentation, and to a computer-implemented method and apparatus for perform- ing semantic image segmentation using a trained machine learning, ML, model. The training method enables a seman- tic image segmentation ML model that is able to make predictions faster, without significant loss in accuracy. The training method also enables the ML model to be imple- mented on apparatus with different hardware specifications, i.e. different computational power and memory, for example.

As mentioned above, it is important to alleviate the latency burden, especially for edge deployment on resource- constrained platforms. In this direction, recent work has focused on the design of lightweight segmentation models either manually or through Neural Architecture Search (NAS). Simultaneously, advances in adaptive DNN infer- ence, offering complementary gains by dynamically adjust- ing the computation path in an input-dependent manner, have been aimed at image classification, leaving challenges in segmentation largely unaddressed. In fact, naively apply- ing early exiting on segmentation CNNs can lead to degraded accuracy due to early-exit "cross-talk" during training, and potential zero latency gains due the inherently heavyweight architecture of segmentation heads. For example, naively adding a single segmentation head on DeepLabV3 can lead to an overhead of up to 40% of the original model's workload. Equally important, the dense output of segmentation models further complicates the exit- policy. Some of these existing techniques are described now.

Efficient segmentation. Semantic segmentation is rapidly evolving, since the emergence of the first CNN-based approaches. Recent advances have focused on optimising accuracy through stronger backbone CNNs, dilated convo- lutions, multi-scale processing and multi-path refinement. To reduce the computational cost, the design of lightweight hand-crafted and more recently via NAS-crafted architec- tures has been explored, with further efforts to compensate for the lost accuracy through knowledge distillation or adversarial training. Advantageously, the framework of the present techniques is model-agnostic and can be applied on top of existent CNN backbones—lightweight or not— achieving significant complementary gains through the orthogonal dimension of input-dependent (dynamic) path selection.

Adaptive Inference. The key paradigm behind adaptive inference is to save computation on "easy" samples, thus reducing the overall computation time with minimal impact on accuracy. Existing methods in this direction can be taxonomised into: 1) Dynamic routing networks selecting a different sequence of operations to run in an input-dependent way, by skipping either layers or channels and 2) Multi-exit networks forming a class of architectures with intermediate classifiers along their depths. With earlier exits running faster and deeper ones being more accurate, such networks provide varying accuracy-cost trade-offs. Existing work has mainly focused on image classification, proposing hand-crafted, model-agnostic and deployment-aware architectures. However, the adoption of these techniques in segmentation models poses additional, yet unexplored, challenges.

Adaptive Segmentation Networks. Recently, initial efforts on adaptive segmentation have been presented. For example, NAS has been combined with a trainable dynamic routing mechanism that generates data-dependent processing paths at run time. However, by incorporating the computation cost to the loss function, this approach lacks flexibility for customising deployment in applications with varying requirements or across heterogeneous devices, without re-training. Layer Cascade (LC) studies early-stopping for segmentation. This approach treats segmentation as a vast group of independent classification tasks, where each pixel propagates to the next exit only if the latest prediction does not surpass a confidence threshold. Nonetheless, due to different per-pixel paths, this scheme leads to heavily unstructured computations, for which existing BLAS libraries cannot achieve realistic speedup. Moreover, LC constitutes a manually-crafted architecture, heavily reliant on Inception-ResNet and is not applicable to various backbones, nor does it adapt its architecture to the capabilities of the target device.

Multi-Exit Network Training. So far, the training of multi-exit models can be categorised into: 1) End-to-end schemes jointly training both the backbone and the early exits, leading to increased accuracy in early exits, at the expense of often downgrading the accuracy deeper on or even causing divergence; and 2) Frozen-backbone methods which firstly train the backbone until convergence and subsequently attach and train intermediate exits individually. This independence of the backbone from the exits allows for faster training of the exits, but at an accuracy penalty due to fewer degrees of freedom in parameter tuning. The present techniques introduce a novel two-stage training scheme for MESS networks, comprising of an exit-aware backbone training step that pushes the extraction of semantically "strong" features early in the network, followed by a frozen-backbone step for fully training the early exits without compromising the final exit's accuracy.

A complementary approach that aims to further improve the early exits' accuracy involves knowledge distillation between exits, studied in classification and domain adaptation tasks. Such schemes employ self-distillation by treating the last exit as the teacher and the intermediate classifiers as the students, without priors about the ground truth. In contrast, the Positive Filtering Distillation (PFD) scheme of the present techniques takes advantage of the densely structured information in semantic segmentation, and only allows knowledge flow for pixels the teacher is correct.

Multi-Exit Segmentation Networks. The present techniques provide a MESS framework, a novel methodology for deriving and training Multi-Exit Semantic Segmentation (MESS) networks from a user-defined architecture for efficient segmentation, tailored to the device and task at hand. Given a CNN, MESS treats it as a backbone architecture and attaches numerous "early exits" (i.e. segmentation heads) at different depths, offering predictions with varying workload-accuracy characteristics. FIG. 1 is a schematic diagram illustrating an instance of such a multi-exit semantic image segmentation model. The term "instance" is used herein to mean a particular configuration or version of the MESS network. That is, the training method trains a single network that comprises a plurality of candidate early exit segmentation network architectures, and an "instance" is one of these candidate architectures. In the example shown in FIG. 1, the depicted instance comprises two early exits that are attached to the backbone network at various locations, and a final exit that is provided at the end of the backbone network (and which is part of the backbone network). Importantly, the architecture, number and placement of early exits remain configurable and can be co-optimised via search upon deployment to target devices of different capabilities and application requirements, without the need to retrain, leading to a train-once, deploy-everywhere paradigm. This way, MESS can support various inference pipelines, ranging from sub-network extraction to progressive refinement of predictions and confidence-based exiting.

MESS networks bring together benefits from all the above worlds. The framework of the present techniques combines end-to-end with frozen-backbone training, hand-engineered dilated networks with automated architectural configuration search, and latency-constrained inference with confidence-based early exiting, in a holistic approach that addresses the unique challenges of detailed scene understanding models.

Advantageously, the present techniques provide a design of MESS networks that combines adaptive inference through early exits with architecture customisation, to provide a fine granularity speed-accuracy trade-off, that is tailor-made for semantic segmentation tasks. This allows for efficient inference based on the difficultly of the input and the capabilities of the target device.

As mentioned above, the present techniques provide a method for training a ML model which has the form of a multi-exit semantic segmentation network (or progressive segmentation network). The network comprises numerous early-exit points (i.e. segmentation heads) attached to different depths of a backbone convolutional neural network (CNN) architecture. This offers segmentation predictions with varying workload (and accuracy) characteristics, introducing a "train-once-deploy-everywhere" approach for efficient semantic segmentation. Advantageously, this means that the network can be parametrised without the need to retrain in order to be deployed across heterogeneous target devices of varying capabilities (low to high end).

The ML model of the present techniques can accommodate a wide range of diverse deployment scenarios, including, for example:

extracting workload-lighter sub-models for deployment on devices with varying computation capabilities (e.g. mobile phones) to satisfy latency constraints by completely skipping parts of the computation.

selecting computation path at runtime, according to allocation of available resources on the target device, based on compute load, so as to preserve consistent prediction latency.

obtaining a rapid approximation of the prediction in early-stages of the computation and progressively refining it over time.

selecting computation path at run time, according to the difficulty of each input sample/prediction confidence obtained at different computation stages.

partitioning the model for synergistic cloud-device execution (i.e. computation offloading), while still being able to obtain an approximation of the final prediction relying solely to the on-board computational resources (to address network availability/quality issues).

incorporating specialist segmentation exits, focusing on a different set of classes (e.g. humans/pets) or fine-tuned on a user-centric data distribution (e.g. indoor/outdoor)

Backbone Initialisation and Exit Placement. As a first step, a CNN backbone is provided. Typical semantic segmentation CNNs try to prevent the loss of spatial information that inherently occurs in classification, without reducing the receptive field on the output pixels. For example, Dilated Residual Networks allow up to 8× spatial reduction in the feature maps, and replace any further traditional downsampling with a doubling in dilation rate in convolution operations. A similar assumption is adopted for the backbones used to generate MESS networks.

This approach, however, increases the feature resolution in deeper layers, which usually integrate a higher number of channels. As a result, typical CNN architectures for segmentation contain workload-heavier layers deeper on, leading to an unbalanced distribution of computational demands and an increase in the overall workload. This fact further motivates the need for early-exiting in order to eliminate unnecessary computation and save on performance.

As a next step, the provided backbone is benchmarked. The benchmarking may be based on a per-layer FLOPS workload, the number of parameters, or latency on a target device. Based on the results of this analysis, N candidate exit points are identified. For simplicity, exit points are restricted to be at the output of individual network blocks $b_k$, following an approximately equidistant workload distribution (i.e. every 1/N-th of the total backbone's FLOPs). This way, instead of searching between similar exit placements, the distance between one another is maximised and the search efficiency is improved.

Early-Exit Architecture. Early-exiting in DNNs faces the defiance of limited receptive field and weak semantics in shallow exits. These challenges are addressed in a two-fold manner: i) by pushing the extraction of semantically strong features to shallower layers of the backbone during training, and ii) by introducing a carefully designed architectural configuration space for each exit based on its position in the backbone, which is explored to yield a MESS instance, tailored to the latency and accuracy constraints.

Figure 2:
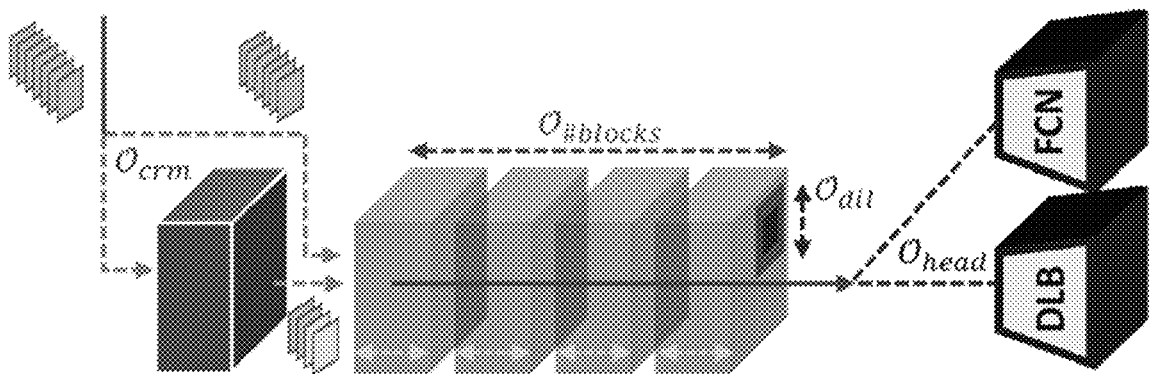
FIG. 2 shows a schematic diagram of an exit architecture of the model.

Architectural Configuration Space. FIG. 2 shows a schematic diagram of an exit architecture of the model. Overall, the configuration space for each exit head (FIG. 2) is shaped as:

1. Channel Reduction Module: $O_{crm}=\{1, 2, 4, 8\}\mapsto\{0, 1, 2, 3\}$
2. Extra Trainable Blocks: $O_{blocks}=\{0, 1, 2, 3\}$
3. Rapid Dilation Increase: $O_{dil}=\{False, True\}\mapsto\{0, 1\}$
4. Segmentation Head: $O_{head}=\{FCN\text{-}Head, DLB\text{-}Head\}\mapsto\{0, 1\}$ Formally, the configuration space for the i-th exit's architecture is represented as: $S_{exit}{}^{i}=O_{crm}\times O_{blocks}\times O_{dil}\times O_{head}$, where $O_{crm}$, $O_{blocks}$, $O_{dil}$ and $O_{head}$, are the sets of available options for the CRM, number of trainable blocks, rapid dilation increase and segmentation head respectively.

Channel Reduction Module (CRM). A main differentiating challenge of early-exiting in segmentation, compared to classification, is the significantly higher workload of segmentation heads, stemming from the enlarged input feature volume being processed. To reduce the overhead of each exit, instead of compromising the spatial resolution of the feature volume that is particularly important for accuracy, the present techniques focus optimisation efforts on the channel dimension. In this direction, the proposed configuration space includes the optional addition of a lightweight CRM, comprising a 1×1 convolutional layer that rapidly reduces the number of channels fed to the segmentation head by a tunable factor.

Extra Trainable Blocks. Classification-centric approaches address feature extraction challenges of early classifiers by incorporating additional layers in each exit. Again, due to the enlarged volume of feature maps in segmentation networks, naively introducing vanilla-sized layers may result to a surge in the exit's workload overhead, defeating the purpose of early-exiting. In MESS networks, this is exposed as a configurable option that can be employed to remedy weak semantics in shallow exits, while such layers are carefully appended after the CRM in order to take advantage of the computational efficiency of the reduced feature-volume width.

Rapid Dilation Increase. To address the limited receptive field of shallow exits, apart from supporting the addition of dedicated trainable layers in each exit, the present framework allows the dilation rate of these layers to be rapidly increased.

Segmentation Head. Currently, the proposed framework supports two types of segmentation head architectures: i) Fully Convolutional Network-based Head (FCN-Head) (Jonathan Long, Evan Shelhamer, and Trevor Darrell. Fully Convolutional Networks for Semantic Segmentation. In IEEE Conference on Computer Vision and Pattern Recognition (CVPR), pages 3431-3440, 2015) and ii) DeepLabV3-based Head (DLB-Head) (Liang-Chieh Chen, Yukun Zhu, George Papandreou, Florian Schroff, and Hartwig Adam. Encoder-Decoder with Atrous Separable Convolution for Semantic Image Segmentation. In European Conference on Computer Vision (ECCV), pages 801-818, 2018). The former provides a simple and effective mechanism for upsampling the feature volume through de-convolution and predicting a per-pixel probability distribution across all candidate classes. The latter incorporates Atrous Spatial Pyramid Pooling (ASPP) comprising parallel convolutions of different dilation rates in order to incorporate multi-scale contextual information to its predictions.

Notably, the majority of related work employ a uniform architecture for all exits for the sake of simplicity. However, as explained below, different exit depths pose their own challenges, with shallow exits benefiting the most from numerous lightweight layers, whereas deeper exits favour channel-rich exit architectures. The framework of the present techniques favours customisation, enabling the efficient search for a model with tailored architecture at each exit, through a two-stage training scheme.

Training Scheme. Having the network architecture set, the training methodology of the present techniques is now explained, which comprises a two-stage pipeline enhanced with positive filtering distillation. As mentioned above, early-exit networks are typically either trained end-to-end or in a frozen-backbone manner. However, both can lead to suboptimal accuracy results. For this reason, the present techniques combine the best of both worlds by proposing a novel two-stage training scheme.

Stage 1 (end-to-end). In the exit-aware pre-training stage, bare FCN-Heads are attached to all candidate exit points, generating an intermediate "super-model". (The selection of FCN vs. DLB heads here is for speed and guidance purposes of the coarse training step. Selected heads are refined in Stage 2.) The network is trained end-to-end, updating the weights of the backbone and a single early exit at each iteration, with the remainder of the exits being dropped-out in a round-robin fashion (Eq. (1), referred to as exit-dropout loss). Formally, the segmentation predictions after softmax for each early exit are denoted by $y_i \in$ where R and C are the output's number of rows and columns, respectively, and M the number of classes. Given the ground-truth labels $\hat{y}$ $\in \{0,1, \ldots, M{-}1\}^{R \times C}$, the loss function for the proposed exit-aware pre-training stage is formulated as:

$$L_{pretrain}^{batch(i)} = \Sigma_{i=1}^{N-1} \big\langle \text{jmodi}{=}0 \big\rangle \cdot L_{CE}(y_i, \hat{y}) + L_{CE}(y_N, \hat{y}) \qquad (1)$$

Although after this stage the early exits are not fully trained, their contribution to the loss pushes the backbone to extract semantically stronger features even at shallow layers.

Stage 2 (frozen-backbone). At this stage, the backbone and final exit are kept frozen (i.e. weights are not updated). All candidate early-exit architectures in $S_{exit}^i$ are attached across all candidate exit-points $i \in \{1,2, \ldots, N\}$ and trained individually, taking advantage of the strong semantics extracted by the backbone. Most importantly, keeping the backbone unchanged allows different exit architectures to be trained without interference, and interchanged at deployment time in a plug-and-play manner, offering enormous flexibility for customisation.

Thus, the present techniques provide a computer-implemented method for generating a machine learning, ML, model for semantic image segmentation, the method comprising: providing a backbone feature extraction network of the ML model with a plurality of early exits in the backbone network, to generate an overprovisioned network comprising a plurality of candidate early exit segmentation network architectures, wherein each early exit comprises a tailored network architecture; obtaining a training dataset comprising a plurality of images; and training the backbone network of the ML model, a final exit and the early exits to output feature maps for the plurality of images input into the backbone network, by: training, during a first training stage, the backbone network, the final exit and the early exits end-to-end; and freezing weights of the backbone network and the final early exit, after the end-to-end training is complete, and training, during a second training stage, the early exits individually using the final exit as a teacher for the early exits.

As noted above, the first training stage comprises iteratively training the backbone network and early exits, wherein during each iteration the training comprises: selecting one early exit of the plurality of early exits to be updated; dropping-out an early exit of the remainder of the early exits; and training the backbone network and the selected early exit and updating weights of the backbone network and selected early exit. For each selected early exit, the remainder of the early exits may be sequentially dropped-out during each iteration of training the selected early exit.

Positive Filtering Distillation. In the last stage of the present training process, the joint potential of knowledge distillation and early-exit networks for semantic segmentation is further exploited. In prior self-distillation works for multi-exit networks, the backbone's final output is used as the teacher for earlier classifiers, whose loss function typically combines ground-truth and distillation-specific terms. To further exploit what information is backpropagated from the pre-trained final exit, Positive Filtering Distillation (PFD) is proposed, a technique that selectively controls the flow of information to earlier exits using only signals from samples about which the last exit is correct. The hypothesis is that early exit heads can become stronger feature extractors by incorporating signals of easy samples from the last exit, and avoiding the confusion of trying to mimic contradicting references.

Driven by the fact that segmentation outputs are dense, the proposed distillation scheme evaluates the difficulty of each pixel in the input sample with respect to the correctness of the teacher's prediction (i.e. final output). Subsequently, the stronger (higher entropy) ground-truth reference signal fed to early exits is filtered, allowing only information for "easy" pixels to pass through. Thus, the training efforts and the learning capacity of each exit are concentrated to "easier" pixels, by avoiding the pollution of the training algorithm with noisy gradients from contradicting loss terms.

Formally, the i-th exit's tensor of predicted classes for each pixel is expressed as $p{=}(r, c)$ with $r \in [1, R]$ and $c \in [1,C]$ as $\hat{y}_i \in \{0,1, \ldots, M{-}1\}^{R \times c}$ where in $\{0,1, \ldots, M{-}1\}$. Given the corresponding output of the final exit $\hat{y}_N$, the ground-truth labels $\hat{y} \in \{0,1, \ldots, M{-}1\}^{R \times c}$ and a hyperparameter $\alpha$, the following loss function is used for the frozen-backbone stage of the training scheme:

$$L_{PFD} = \Sigma_{i=1}^{N} \alpha \cdot L_{KL}(y_i, y_N) + (1{-}\alpha) \cdot I(\hat{y}_N, \hat{y}) L_{CE}(y_i, \hat{y}) \qquad (2)$$

where $L_{CE}$ and $L_{KL}$ denote the cross-entropy loss and KL divergence respectively, and/the indicator function.

In other words, the second training stage may comprise: determining, using a segmentation prediction made for an image by the final exit, a difficulty of each pixel in the image based on whether the prediction for each pixel is correct; and training the early exits using only the pixels for which the prediction is correct.

Deployment-Time Parameterisation. Having trained the overprovisioned network comprising all candidate exit architectures, MESS instances can be derived for the use-case at hand by exhaustive architectural search, reflecting on the capabilities of the target device, the intricacy of the inputs and the required accuracy or latency.

Figure 3A:
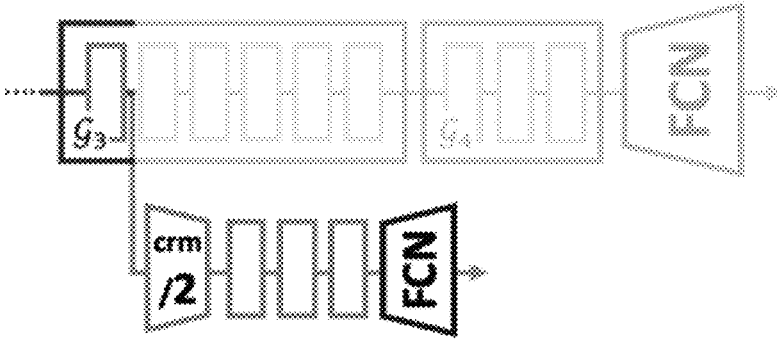
FIGS. 3A, 3B and 3C illustrate, respectively, how an architecture of the ML model may be configured when performing budgeted inference, anytime inference and input-dependent inference.
Figure 3B:
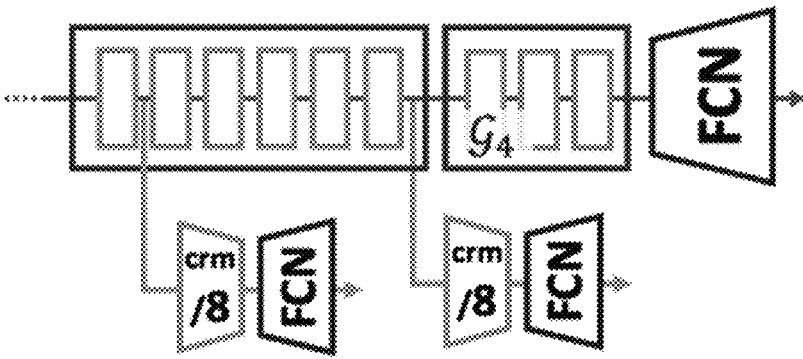
Figure 3C:
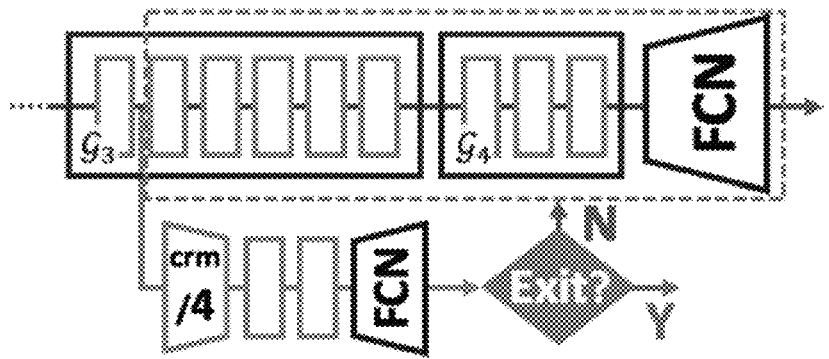

Inference Settings. To satisfy performance needs under each device, and application-specific constraints, MESS networks support different inference settings: i) budgeted inference, in which workload-lighter sub-models up to a specific exit are extracted to enable deployment on heterogeneous platforms with diverse computational capabilities, ii) anytime inference, in which every sample goes through exits sequentially, initially providing a rapid approximation of the output and progressively refining it through deeper exits until a deadline is met, adjusting its computation depth at runtime according to the availability of resources on the target platform, or iii) input-dependent inference, where each sample dynamically follows a different computation path according to its difficulty, as captured by the confidence of each exit's prediction. FIGS. 3A, 3B and 3C illustrate, respectively, how an architecture of the ML model may be configured when performing budgeted inference, anytime inference and input-dependent inference. These will be explained in more detail below.

Configuration Search. The present framework tailors MESS networks for each of these settings, through an automated search of the configuration space. Concretely, a search for the number, position and architecture of early exits is performed, along with the exit policy for the input-dependent inference case.

Number, Placement & Configuration of Exits. The proposed methodology contemplates all trained exit architectures and exhaustively creates different configurations, trading for example a workload-heavier shallow exit with a more lightweight deeper exit. The search strategy considers the target inference setting, along with user-specified requirements in workload, latency and accuracy, which can be expressed as a combination of hard constraints and optimisation objectives. As a result, the number and placement of exits and the architecture of each individual exit of the resulting MESS instance are jointly optimised.

Given the exit-architecture search space $S_{exit}^i$, the configuration space of a MESS network is defined as:

$$S=(S_{exit}^1+1)\times(S_{exit}^2+1)\times \ldots \times(S_{exit}^N+1) \qquad (3)$$

where the extra term accounts for a "None" option for each of the exit positions. Under this formulation, the framework can minimise workload/latency (expressed as cost), given an accuracy constraint $th_{acc}$:

$$s^* = \operatorname*{argmin}_{s \in S}\{\text{cost}(s) \vee acc(s) \geq th_{acc}\} \qquad (4)$$

or optimise for accuracy, given a cost constraint $th_{cost}$:

$$s^* = \operatorname*{argmax}_{s \in S}\{acc(s) \vee \text{cost}(s) \leq th_{cost}\} \qquad (5)$$

Most importantly, the two-stage training scheme described above allows all trained exits to be interchangeably attached to the same backbone for inference. This allows for an extremely efficient search of an overly complex space, avoiding the excessive search times of NAS approaches. Additionally, MESS networks can be customised for different requirements without the need for re-training, while the exhaustive enumeration of the proposed search guarantees the optimality of the selected design point.

The method may further comprise performing architecture configuration search to identify an architecture from the plurality of candidate early exit segmentation network architectures that is suitable for a particular application.

The method may further comprise: receiving a hardware constraint and/or an inference performance requirement; receiving an inference setting for a specific device or class of devices which will be used to process input images at inference time; and performing the architecture configuration search using the received hardware constraint and/or inference performance requirement, and the received inference setting.

FIG. 3A illustrates an example of an instance of the ML model which may be used when performing budgeted inference on a user device. If budgeted inference is to be used to process a received image on a specific device or class of devices, the present framework searches for and extracts a suitable submodel or instance from the ML model (which may be thought of as an architecture from the candidate early exit segmentation network architectures of the ML model). In this budgeted inference case, the architecture configuration search outputs an architecture which comprises a backbone feature extraction network and a single early exit.

As shown in FIG. 3A, the submodel comprises the backbone network and a single early exit which meets any latency requirements given the user device's hardware configuration, i.e. the processing and memory constraints. This is achieved by assessing the accuracy and latency performance of all possible submodels (or instances or candidates) and selecting the highest performing one that satisfies the latency requirements. Thus, in FIG. 3A, a single early exit or segmentation head is appended to the backbone network. In this example, the early exit is located at a relatively early position along the backbone network, but it will be understood the early exit could be positioned anywhere along the backbone network as long as the latency requirements are satisfied.

Determining at least one hardware constraint may comprise receiving information on at least one of: a computational load of the apparatus, a memory capacity of the apparatus, and power consumption of the apparatus.

Once the ML model has been configured for this device or class of devices (i.e. the submodel has been extracted), the ML model can be provided to the device for use by the device to perform image segmentation on the received image. Thus, the method may further comprise sending or transmitting or otherwise making available the identified and extracted early exit segmentation network architecture to a device having the same hardware constraints.

FIG. 3B illustrates an example of an instance of the ML model which may be used when performing anytime inference on a user device. If anytime inference is to be used to process an image, the present framework selects a plurality of (a subset of) early exits from all possible early exits, with the aim of providing progressive refinements of the segmentation prediction. That is, the framework extracts a submodel or instance or architecture from the candidate early exit segmentation network architectures of the ML model. User-provided target requirements may dictate the minimum accuracy/latency for each refinement, as well as the refinement intervals. To yield the highest performing subset of early exits, the framework considers each exit independently and aims to minimise the overhead introduced by each exit, while meeting the target requirements.

In the received inference case, the architecture configuration search outputs an architecture which comprises a backbone feature extraction network and multiple early exits.

FIG. 3C illustrates an example of an instance of the ML model which may be used when performing input-dependent inference on a user device. If input-dependent inference is to be used to process the received image, the present framework selects the subset of early exits together with a tuned early-exit policy that will meet target requirement on the target platform (i.e. target user device). This is done by considering all possible early exit combinations and exit policies through an exhaustive enumeration of all the different numbers and positions of early exits. As such the framework yields the highest performing early exit policy and number and positioning of early exits for the target user device or target application/use case.

In the input-dependent inference case, the architecture configuration search outputs an architecture which comprises a backbone feature extraction network and multiple early exits, and wherein the architecture comprises a confidence evaluation unit associated with each early exit to evaluate, at inference time, a confidence of a prediction made by each early exit.

Early-exit Criterion. Driven by the fact that not all inputs pose the same prediction difficulty, adaptive inference has been widely studied in image classification. In this setting, each input sample goes through the selected early exits sequentially. After a prediction is produced from an exit, a mechanism to calculate an image-level confidence (as a metric of predicting difficulty) is used to determine whether inference should continue to the next exit or not.

This technique remains highly unexplored in dense prediction problems, such as semantic segmentation. In some existing techniques, each pixel in an image is treated as an independent classification task, exiting early if its prediction confidence in an exit is high, thus yielding irregular computation paths. In contrast, the present approach treats the segmentation of each image as a single task, aiming to drive each sample through a uniform computation route. To this end, the present techniques fill a gap in literature by introducing a novel mechanism to quantify the overall confidence in semantic segmentation predictions.

Confidence-tuning for MESS Networks. Starting from a per-pixel confidence map, calculated based on the probability distribution across classes of each pixel $c^{map}=f_c(y) \in$ (where $f_c$ is usually top1($\cdot$) or entropy($\cdot$)), the present techniques provide a mechanism to reduce these every-pixel confidence values to a single (per-image) confidence value. The proposed metric considers the percentage of pixels with high prediction confidence (above a tunable threshold $thr_i^{pix}$) in the dense output of an exit $y_i$:

$$c_i^{ovrl} = \frac{1}{RC}\sum_{r=1}^{R}\sum_{c=1}^{C} I\left(c_{r,c}^{map}(y_i) \geq th_i^{pix}\right) \quad (6)$$

Moreover, it has been observed that due to the progressive downsampling of the feature volume in CNNs, some spatial information is lost. As a result, semantic predictions near object edges are naturally under-confident. Driven by this observation, the proposed metric is enhanced to account for these expected low-confidence pixel-predictions. Initially, edge detection is conducted on the semantic masks, followed by an erosion filter with kernel equal to the feature volume spatial downsampling rate (8×), in order to compute a semantic-edge map M:

$$M = erode(cannyEdge(\hat{y}_i), 8) \quad (7)$$

Finally, a median-based smoothing is applied on the confidence values of pixels lying on the semantic edges:

$$c_{r,c}^{map}(y_i) = \begin{cases} median\left(c_{w_r,w_c}^{map}(y_i)\right) & \text{if } M_{r,c} = 1 \\ c_{r,c}^{map}(y_i) & \text{otherwise} \end{cases} \quad (8)$$

where $w_i = \{1-W, \ldots, 1+W\}$ and W is a tunable window size.

At inference time, each sample is sequentially processed by the selected early exits. For each prediction $y_i$, the proposed metric $c_i^{ovri}$ is calculated, and a tunable confidence threshold (exposed to the search space as exit policy) determines whether the sample will exit early ($c_i^{ovri} \geq th_i$) or be processed further by subsequent backbone layers/exits.

The confidence evaluation unit for each early exit is configured to: calculate a confidence value of the image segmentation prediction made by the associated early exit for the image as a whole; determine whether the confidence value is greater than or equal to a threshold confidence value; and instruct the processing to continue to a subsequent early exit when the confidence value is below the threshold confidence value, or instruct the processing to terminate when the confidence value is greater than or equal to the threshold confidence value.

Thus, calculating a confidence value for the image as a whole may comprise: obtaining a per-pixel confidence map comprising confidence values for each pixel of the image; identifying pixels located close to semantic edges of objects within the prediction; and outputting a percentage value of pixels in the image which have a per-pixel confidence value greater than or equal to the threshold confidence values, wherein contributions of the identified pixels are downgraded. The threshold confidence value is optimised for each early exit during the architecture configuration search.

Thus, the present techniques provide a computer-implemented method for using a trained machine learning, ML, model for semantic image segmentation on a device, the method comprising: obtaining an instance of a trained ML model, the instance being an early exit segmentation network architecture associated with the device or a class of devices to which the device belongs and suitable for an inference setting used by the device; receiving an image to be processed by the instance of the trained ML model; and performing, using the instance of the trained ML model, image segmentation on the received image. It will be understood that the term "obtaining" may mean that the instance of the trained ML model is obtained from a server, which may occur once. It will be understood that the term "obtaining" may mean that the instance of the trained ML model is obtained from memory or local storage on the device for use each time image segmentation is to be performed.

When the early exit segmentation network architecture comprises a backbone feature extraction network and a single early exit, performing image segmentation may comprise outputting an image segmentation prediction from the single early exit.

When the early exit segmentation network architecture comprises a backbone feature extraction network and multiple early exits, performing image segmentation may comprise sequentially processing the image by the early exits. As noted above, the network architecture of each early exit may be the same or different (i.e. non-uniform). After processing by an early exit, the method may comprise: providing an image segmentation prediction from the early exit; calculating a confidence value of the image segmentation prediction for the image as a whole; determining whether the confidence value is greater than or equal to a threshold confidence value; and processing the image using a subsequent early exit when the confidence value is below the threshold confidence value; or outputting the image segmentation prediction from the early exit when the confidence value is greater than or equal to the threshold confidence value. The confidence value for the image as a whole may be determined by considering a percentage of pixels in an image with a pixel-level confidence above the threshold confidence value. Thus, the number of pixels with a confidence above the threshold confidence value is determined out of the total number of pixels in the image, and this percentage is used to determine whether the threshold confidence value has been satisfied by the whole image.

When the early exit segmentation network architecture comprises a backbone feature extraction network, multiple early exits, and a confidence evaluation unit associated with each early exit, wherein the confidence evaluation unit for each early exit is configured to: obtain a per-pixel confidence map comprising confidence values for each pixel of the image; identify pixels located close to semantic edges of objects within the prediction; and generate a confidence value for the image as a whole, wherein the confidence value is a percentage value of pixels in the image which have a per-pixel confidence value greater than or equal to a threshold confidence value associated with the early exit, wherein contributions of the identified pixels are downgraded.

Evaluation. The evaluation of the present techniques is now explained.

Models & Datasets. The proposed methodology is applied on top of DRN-50 (Fisher Yu, Vladlen Koltun, and Thomas Funkhouser. Dilated Residual Networks. In IEEE Conference on Computer Vision and Pattern Recognition (CVPR), pages 472-480, 2017), DeepLabV3 (Liang-Chieh Chen, George Papandreou, Florian Schroff, and Hartwig Adam. Rethinking Atrous Convolution for Semantic Image Segmentation. arXiv preprint arXiv:1706.05587, 2017), and MNetV2 (Mark Sandler, Andrew Howard, Menglong Zhu, Andrey Zhmoginov, and Liang-Chieh Chen. MobileNetV2: Inverted Residuals and Linear Bottlenecks. In IEEE Conference on Computer Vision and Pattern Recognition (CVPR), pages 4510-4520, 2018), segmentation CNNs, using ResNet50 (Kaiming He, Xiangyu Zhang, Shaoqing Ren, and Jian Sun. Deep Residual Learning for Image Recognition. In IEEE Conference on Computer Vision and Pattern Recognition (CVPR), pages 770-778, 2016) and MobileNetV2 backbones, representing high-end and edge use-cases respectively. All backbones are trained on MS COCO (Tsung-Yi Lin, Michael Maire, Serge Belongie, James Hays, Pietro Perona, Deva Ramanan, Piotr Doll'ar, and C Lawrence Zitnick. Microsoft COCO: Common Objects in Context. In European Conference on Computer Vision (ECCV), pages 740-755, 2014) and fine-tune early exits on MS COCO and PASCAL VOC (Mark Everingham, Luc Van Gool, Christopher KI Williams, John Winn, and Andrew Zisserman. The Pascal Visual Object Classes (VOC) Challenge. International Journal of Computer Vision (IJCV), 88(2):303-338, 2010) independently.

MS COCO forms one of the largest datasets for dense seen understanding tasks. Thereby, it acts as common ground for pre-training semantic segmentation models, across domains. Following common practice for semantic segmentation, only the 20 semantic classes of PASCAL VOC are considered (plus a background class), and any training images that consist solely of background pixels are discarded. This results in 92.5K training and 5K validation images. The $b_R$ is set for COCO to 520×520. PASCAL VOC: PASCAL VOC (2012) comprises the most broadly used benchmark for semantic segmentation. It includes 20 foreground object classes (plus a background class). The original dataset consists of 1464 training and 1449 validation images. Following common practise, the augmented training set provided by Hariharan et al is adopted (Bharath Hariharan, Pablo Arbelaez, Lubomir Bourdev, Subhransu Maji, and Jitendra Malik. Semantic contours from inverse detectors. In 2011 International Conference on Computer Vision, pages 991-998. IEEE, 2011), resulting in 10.5K training images. For PASCAL VOC, $b_R$ is set (equally to MS COCO) to 520×520.

Development & Deployment Setup. MESS networks are implemented on PyTorch (v1.6.0), building on top of torchvision (v0.6.0). At inference time, MESS network instances are deployed on both a high-end (Nvidia GTX1080Ti-equipped desktop; 400 W TDP) and an edge (Nvidia Jetson Xavier AGX; 30 W TDP) platform.

Baselines. To assess performance against the state-of-the-art (SOTA), comparisons are made with the following baselines: 1) E2E SOTA (Gao Huang, Danlu Chen, Tianhong Li, Felix Wu, Laurens van der Maaten, and Kilian Weinberger. Multi-Scale Dense Networks for Resource Efficient Image Classification. In International Conference on Learning Representations (ICLR), 2018.); 2) Frozen SOTA (Yigitcan Kaya, Sanghyun Hong, and Tudor Dumitras. Shallow-Deep Networks: Understanding and Mitigating Network Overthinking. In International Conference on Machine Learning (ICML), pages 3301-3310, 2019); 3) SelfDistill (Linfeng Zhang, Zhanhong Tan, Jiebo Song, Jingwei Chen, Chenglong Bao, and Kaisheng Ma. SCAN: A Scalable Neural Networks Framework Towards Compact and Efficient Models. In Advances in Neural Information Processing Systems (NeurIPS), 2019); 4) DRN (Fisher Yu, Vladlen Koltun, and Thomas Funkhouser. Dilated Residual Networks. In IEEE Conference on Computer Vision and Pattern Recognition (CVPR), pages 472-480, 2017); 5) DLBV3 (Liang-Chieh Chen, Yukun Zhu, George Papandreou, Florian Schroff, and Hartwig Adam. Encoder-Decoder with Atrous Separable Convolution for Semantic Image Segmentation. In European Conference on Computer Vision (ECCV), pages 801-818, 2018); 6) segMBNetV2 (Mark Sandler, Andrew Howard, Menglong Zhu, Andrey Zhmoginov, and Liang-Chieh Chen. MobileNetV2: Inverted Residuals and Linear Bottlenecks. In IEEE Conference on Computer Vision and Pattern Recognition (CVPR), pages 4510-4520, 2018); and 7) LC (Xiaoxiao Li, Ziwei Liu, Ping Luo, Chen Change Loy, and Xiaoou Tang. Not All Pixels Are Equal: Difficulty-aware Semantic Segmentation via Deep Layer Cascade. In IEEE Conference on Computer Vision and Pattern Recognition (CVPR), pages 3193-3202, 2017).

Exit-Aware Pre-training. Initially, the effectiveness of the proposed exit-aware pre-training scheme is demonstrated. The accuracy of models with uniform exit configuration across all candidate exits points is compared, where the models are trained using different strategies. Table 1 summarises the results of this comparison on a ResNet50-based DRN backbone (DRN-50) with N=6. The top cluster (rows (i)-(iv)) provides alternative initialisation schemes for the network, each using a different loss function and integrating different exits. These serve as alternatives to the end-to-end pre-training step (stage 1, defined above). The last group in the table represents different training schemes, using candidates of the first group as initialisations. The experiments were repeated three times.

TABLE 1

Per-exit accuracy for different training schemes on DRN-50.

| Baseline | | Training | Init. | Loss | Mean IoU: Exit(Backbone Workload %) | | | | | |
| --- | --- | --- | --- | --- | --- | --- | --- | --- | --- | --- |
| | | - DRN-50 - | | | $E_1$(~20%) | $E_2$(~30%) | $E_3$(~40%) | $E_4$(~60%) | $E_5$(~80%) | $E_6$(100%) |
| Initialisation Variant | (i) | End-to-End | ImageNet | CE($E_6$) | — | — | — | — | — | 59.02% |
| Initialisation Variant | (ii) | End-to-End | ImageNet | CE($E_3$) + CE($E_6$) | — | — | 49.82 | — | — | 59.64% |
| Initialisation Variant | (iii) | End-to-End | ImageNet | CE($E_1$) + CE($E_6$) | 34.94% | — | — | — | — | 58.25% |
| Initialisation (MESS) | (iv) | End-to-End | ImageNet | Eq. (1) (MESS) | 28.21% | 39.61% | 47.13% | 50.81% | 56.11% | 59.90% |
| E2E SOTA | (v) | End-to-End | ImageNet | CE($E_1$) + . . . + CE($E_6$) | 29.02% | 40.67% | 48.64% | 51.69% | 55.34% | 58.33% |
| Frozen SOTA | (vi) | Frozen | (i) | CE($E_1$), . . . , CE($E_5$) | 23.94% | 31.50% | 38.24% | 44.73% | 54.32% | 59.02% |

TABLE 1-continued

Per-exit accuracy for different training schemes on DRN-50.

| Baseline | | Training | Init. | Loss | Mean IoU: Exit(Backbone Workload %) | | | | | |
|---|---|---|---|---|---|---|---|---|---|---|
| | | | - DRN-50 - | | $E_1$(~20%) | $E_2$(~30%) | $E_3$(~40%) | $E_4$(~60%) | $E_5$(~80%) | $E_6$(100%) |
| Frozen Ablated Variant | (vii) | Frozen | (ii) | $CE(E_1), \ldots,$ $CE(E_5)$ | 27.79% | 39.11% | 49.96% | 51.84% | 56.88% | 59.64% |
| Frozen Ablated Variant | (viii) | Frozen | (iii) | $CE(E_1), \ldots,$ $CE(E_5)$ | 35.15% | 38.76% | 42.60% | 46.77% | 54.83% | 58.25% |
| MESS | (ix) | Frozen | (iv) | $CE(E_1), \ldots,$ $CE(E_5)$ | 32.40% | 43.34% | 50.81% | 53.73% | 57.9% | 59.90% |

By adding an early exit into the loss function, the aim is to push the extraction of semantically strong features towards shallow parts of the network. Results from different initialisations show that adding a single exit under end-to-end training can even boost the accuracy of the final segmentation prediction (row (ii)). Similar to its usage in GoogLeNet, it is postulated that the extra signal midway through the network acts both as a regulariser and as an extra backpropagation source, reducing the potential effect of vanishing gradients. However, this effect quickly fades when exits are attached at very early layers (row (iii)) or when more exits are attached and trained jointly. This is depicted in E2E SOTA (row (v)), which represents the end-to-end training scheme. Both of these training approaches can lead to degraded accuracy of the final output, probably attributed to contradicting signals between the early and the late classifiers and to the larger losses of the early results, which dominate the loss function. Therefore, an exit-dropout loss is proposed that only trains the early exits one-by-one in an alternating fashion, yielding the highest accuracy on the final exit (row (iv)).

The bottom cluster of rows in Table 1 lists the same setups as before, but after the second stage of training is applied, as defined in above. For example, Frozen SOTA (row (vi)) represents the case where the early exits are trained when attached to a frozen pre-trained vanilla backbone. A key takeaway is that jointly pre-training with at least one early exit can partly benefit adjacent exit heads in the second stage (rows (vii)-(viii) vs. (vi)). However, this effect is largely angled towards the particular exit that was selected during the pre-training and may come at a cost for the deepest classifier. In contrast, the proposed exit-aware initialisation scheme (row (ix)) yields consistently high accuracy results across all exits, without hurting the final exit.

Indicatively, the proposed exit-dropout loss helps the resulting exits to achieve an accuracy gain of up to 12.57 percentage points (pp) compared to a traditionally pre-trained segmentation network (row (i)), and up to 3.38 pp compared to an end-to-end trained model (row (v)), which also suffers a 1.57 pp drop in the accuracy of the final exit.

Positive Filtering Distillation. Here, the benefits of the Positive Filtering Distillation (PFD) scheme is quantified for the second stage (frozen-backbone) of the present training methodology. To this end, PFD is compared against E2E SOTA that utilises cross-entropy loss (CE), the traditional knowledge distillation (KD) approach, and SelfDistill employing a combined loss (CE+KD). Table 2 summarises the results on a representative exit-architecture, on both DRN-50 and MobileNetV2.

TABLE 2

Positive Filtering Distillation ablation (mIoU)

| Baseline | Loss | DRN-50 | | | MobileNetV2 | | |
|---|---|---|---|---|---|---|---|
| | | $E_1$ | $E_2$ | $E_3$ | $E_1$ | $E_2$ | $E_3$ |
| E2E SOTA | CE | 49.96% | 55.40% | 58.96% | 31.56% | 41.57% | 51.59% |
| KD | KD | 50.66% | 55.91% | 58.84% | 32.08% | 41.96% | 51.58% |
| SelfDistill | CE + KD | 50.33% | 55.67% | 59.08% | 31.04% | 41.93% | 51.66% |
| MESS | PFD | 51.02% | 56.21% | 59.36% | 33.36% | 42.95% | 52.20% |

It can be seen that the proposed loss consistently yields higher accuracy across all cases, achieving up to 1.8, 1.28 and 2.32 pp accuracy gains over E2E SOTA, KD and SelfDistill, respectively. This accuracy boost is more salient on shallow exits, concentrating the training process on "easy" pixels, whereas a narrower improvement is obtained in deeper exits, where the accuracy gap to the final exit is natively bridged.

Inference Performance Evaluation. Here, the effectiveness and flexibility of the proposed train-once, deploy-everywhere approach for semantic segmentation is demonstrated, under varying deployment scenarios and workload/accuracy constraints. As mentioned above (and explained with reference to FIGS. 3A-3C), there are three inference settings in MESS networks: i) budgeted inference, ii) anytime inference and iii) input-dependent inference, which can be optimised separately. For this reason, the search to find the best early-exit architecture is deployed for the respective use-case. The performance of optimised MESS networks is shown, under such scenarios below.

Budgeted and Anytime Inference. In budgeted inference, a submodel is searched for that can fit on the device and execute within a given latency/memory/accuracy target. The present method is able to provide the most efficient MESS network configuration, tailored to the requirements of the underlying application and device. The search tends to favour designs with powerful exit architectures, consisting of multiple trainable layers, and mounted earlier in the network. For the case of anytime inference, a given deadline is treated as a cut-off point of computation. When this deadline is met, the last output of the early exit network that is available is taken—or this is used as a placeholder result to be asynchronously refined until the result is actually used. In this paradigm, however, there is an inherent trade-off. On the one hand, denser early exits provide more frequent "checkpoints". On the other hand, each added head is essentially a computational overhead when not explicitly used. To control this trade-off, the method also considers the additional computational cost of each exit, when populating the MESS network architecture. Contrary to budgeted inference, in this setting the search produces heads with extremely lightweight architecture, sacrificing flexibility for reduced computational overhead, mounted deeper in the network. Table 3 showcases that, for anytime inference, the search yields an exit architecture with 11.6× less computational requirements compared to budgeted inference, under the same accuracy constraint. Here, a requirement of 50% mean IoU was used.

TABLE 3

Workload and accuracy for DRN-50 with one early exit for different inference schemes.

Figure 4:
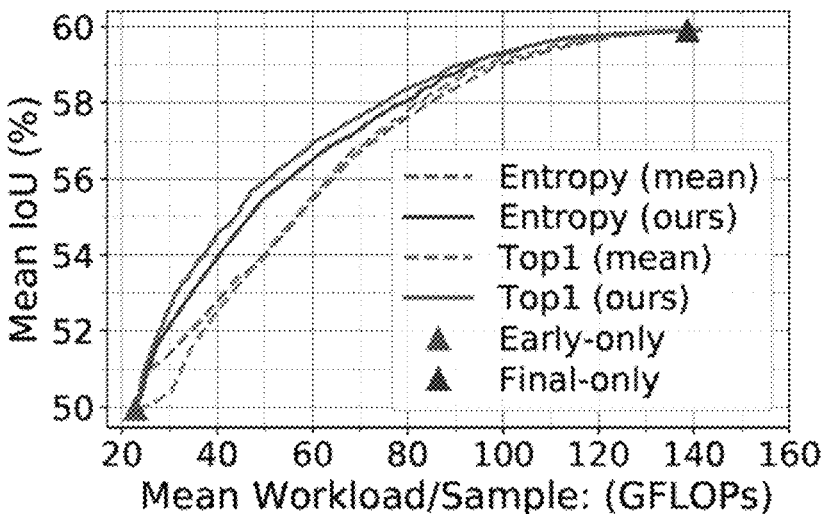
FIG. 4 is a graph comparing performance of different early exit policies/metrics.

| | Inference | Workload (GFLOPs) | | | Mean IoU | |
| | | Overhead | $E_{early}$ | $E_{final}$ | $E_{early}$ | $E_{final}$ |
| --- | --- | --- | --- | --- | --- | --- |
| (i) | Final-Only | — | — | 138.63 | — | 59.90% |
| (ii) | Budgeted | 8.01 | 28.34 | — | 51.76% | — |
| (iii) | Anytime | 0.69 | 39.32 | 139.33 | 50.37% | 59.90% |
| (iv) | Input-Dep. | 2.54 | ($E_{sel}$: 23.02) | | ($E_{sel}$: 50.03%) | | fication-based metrics are naively adapted to segmentation by averaging per-pixel confidences for an image, or the proposed custom metric presented above is applied. FIG. 4 is a graph comparing performance of different early exit policies/metrics. The Cartesian product of these approaches defines the four baselines depicted in FIG. 4, where the effectiveness of the proposed exit scheme is benchmarked against other policies on a DRN-50-based MESS network with two exits. By selecting different threshold values for the exit policy, even the simplest (2-exit) configuration of input-dependent MESS network provides a fine-grained trade-off between workload and accuracy. Exploiting this trade-off, it is observed that input-dependent inference offers the highest computational efficiency under the same 50% mean IoU accuracy constraint.

Furthermore, it can be observed that the proposed image-level confidence metric, applied on top of both top1 probability and entropy-based pixel-level confidence estimators, provides a consistently better accuracy-efficiency trade-off compared to the corresponding averaging counterparts. Specifically, experiments with various architectural configurations showcase a gain of up to 6.34 pp (1.17 pp on average) across the spectrum of thresholding values.

Comparison with SOTA Segmentation Networks.

Single-exit Segmentation Solutions. Here, input-dependent inference is considered and the MESS framework is applied on single-exit alternatives from the literature, namely DRN, DLBV3 and segMBNetV2. Table 4 lists the achieved results for MESS instances optimised for varying use-cases (framed as speed/accuracy requirements fed to the configuration search), as well as the original models.

TABLE 4

End-to-end evaluation of MESS network designs

| Baseline | | Backbone | Head | Search Targets | | Results: MS-COCO | | | Results: Pascal-VOC | | |
| | | | | Error | GFLOPs | mIoU | GFLOPs | Latency [†] | mIoU | GFLOPs | Latency [†] |
| --- | --- | --- | --- | --- | --- | --- | --- | --- | --- | --- | --- |
| DRN | (i) | ResNet50 | FCN | -Baseline- | | 59.02% | 138.63 | 39.96 ms | 72.23% | 138.63 | 39.93 ms |
| MESS | (ii) | ResNet50 | FCN | min | ≤1× | 64.35% | 113.65 | 37.53 ms | 79.09% | 113.65 | 37.59 ms |
| MESS | (iii) | ResNet50 | FCN | ≤0.1% | min | 58.91% | 41.17 | 17.92 ms | 72.16% | 44.81 | 18.63 ms |
| MESS | (iv) | ResNet50 | FCN | ≤1% | min | 58.12% | 34.53 | 15.11 ms | 71.29% | 38.51 | 16.80 ms |
| DLBV3 | (v) | ResNet50 | DLB | -Baseline- | | 64.94% | 163.86 | 59.05 ms | 80.27% | 163.86 | 59.06 ms |
| MESS | (vi) | ResNet50 | DLB | min | ≤1× | 65.52% | 124.10 | 43.29 ms | 80.60% | 142.38 | 43.29 ms |
| MESS | (vii) | ResNet50 | DLB | ≤0.1% | min | 64.86% | 69.84 | 24.81 ms | 80.18% | 85.61 | 31.54 ms |
| MESS | (viii) | ResNet50 | DLB | ≤1% | min | 64.03% | 57.01 | 20.83 ms | 79.40% | 74.20 | 27.63 ms |
| segMBNetV2 | (ix) | MobileNetV2 | FCN | -Baseline- | | 54.24% | 8.78 | 67.04 ms | 69.68% | 8.78 | 67.06 ms |
| MESS | (x) | MobileNetV2 | FCN | min | ≤1× | 57.49% | 8.10 | 56.05 ms | 74.22% | 8.10 | 56.09 ms |
| MESS | (xi) | MobileNetV2 | FCN | ≤0.1% | min | 54.18% | 4.05 | 40.97 ms | 69.61% | 3.92 | 32.79 ms |
| MESS | (xii) | MobileNetV2 | FCN | ≤1% | min | 53.24% | 3.48 | 38.83 ms | 68.80% | 3.60 | 31.40 ms |

Input-Dependent Inference. In the input-dependent inference setting, each input sample propagates through the MESS network at hand and until the model is yields a prediction ($E_{sel}$) about which it is confident enough (Eq. (6)). In this section, MESS networks are instantiated under this setting and the novel confidence metric for dense scene understanding is evaluated.

Confidence Evaluation. Different confidence-based metrics have been proposed for early-exiting. In the realm of classification, these revolve around comparing the entropy or top1 result of the respective exit's softmax to a threshold. On top of this, segmentation presents the problem of dense predictions. As such, either these widely-employed classi- For a DRN-50 backbone with FCN head on MS COCO, it is observed that a latency-optimised MESS instance with no accuracy drop (row (iii)) ∈ an achieve a workload reduction of up to 3.36×, translating to a latency speedup of 2.23×over the single-exit DRN. This improvement is amplified to 4.01× in workload (2.65× in latency) for cases that can tolerate a controlled accuracy degradation of pp (row (iv)). Additionally, a MESS instance optimised for accuracy under the same workload budget as DRN, achieves an mloU gain of 5.33 pp with 1.22× fewer GFLOPs (row (ii)).

Similar results are obtained against DLBV3, as well as when targeting the PASCAL VOC dataset. Moreover, the performance gains are consistent against segMBNetV2

(rows (ix)-(xii)), which forms an inherently efficient segmentation design, with 15.7× smaller workload than DRN-50. This demonstrates the model-agnostic nature of the present framework, yielding complementary gains by exploiting the dimension of input-dependent inference.

Multi-exit Segmentation Solutions. Next, the accuracy and performance of MESS networks are compared against Deep Layer Cascade (LC) (Xiaoxiao Li, Ziwei Liu, Ping Luo, Chen Change Loy, and Xiaoou Tang. Not All Pixels Are Equal: Difficulty-aware Semantic Segmentation via Deep Layer Cascade. In IEEE Conference on Computer Vision and Pattern Recognition (CVPR), pages 3193-3202, 2017) networks, a SOTA work that proposes per-pixel propagation in early-exit segmentation networks. Due to their heavily unstructured computation, standard BLAS libraries cannot realise the true benefits of this approach and, therefore, LC's pixel-level exit policy is applied on numerous MESS configurations, and compared with the present image-level policy analytically.

By using SOTA approaches in semantic segmentation, such as larger dilation rates or DeepLab's ASPP, the gains of LC rapidly fade away, as for each pixel that propagates deeper on, a substantial feature volume needs to be precomputed. Concretely, by using the FCN-head, a substantial 45% of the feature volume at the output of the first exit falls within the receptive field of a single pixel in the final output, reaching 100% for DLB-Head. As a result, no workload reduction for LC is observed for the 2-exit network of Table 4 (row (iv)) and heavily dissipated gains of 1.13× for the 3-exit network of Table 4 (row(iii)), against the corresponding baselines of row (i). In contrast, the respective MESS instances achieve a workload reduction of 6.02× and 3.36×.

FIGS. 5A and 5B show two example input images that have been processed using the semantic segmentation model during training of the model. The left-hand image in FIGS. 5A and 5B shows an example input image, the middle image shows the segmentation prediction of an exit point, and the right-hand image shows the per-pixel confidence for each pixel in the prediction. In order to capture the confidence of a segmentation prediction in total, a way to reduce the per-pixel confidence of the output to a single value is required. Instead of the trivial approach of using arithmetic mean for this task, the present techniques use a reduction formula which considers the percentage of pixels in the prediction that surpass a given confidence threshold. This way, a more robust confidence estimation for a segmentation prediction is obtained, that is not affected by extremely under-confident pixels/areas of the image.

Furthermore, the observation that semantic prediction confidence is always lower in pixels closer to the semantic edges of objects is absorbed, and the contribution these pixels in prediction confidence is downgraded through weighting.

Figure 6B:
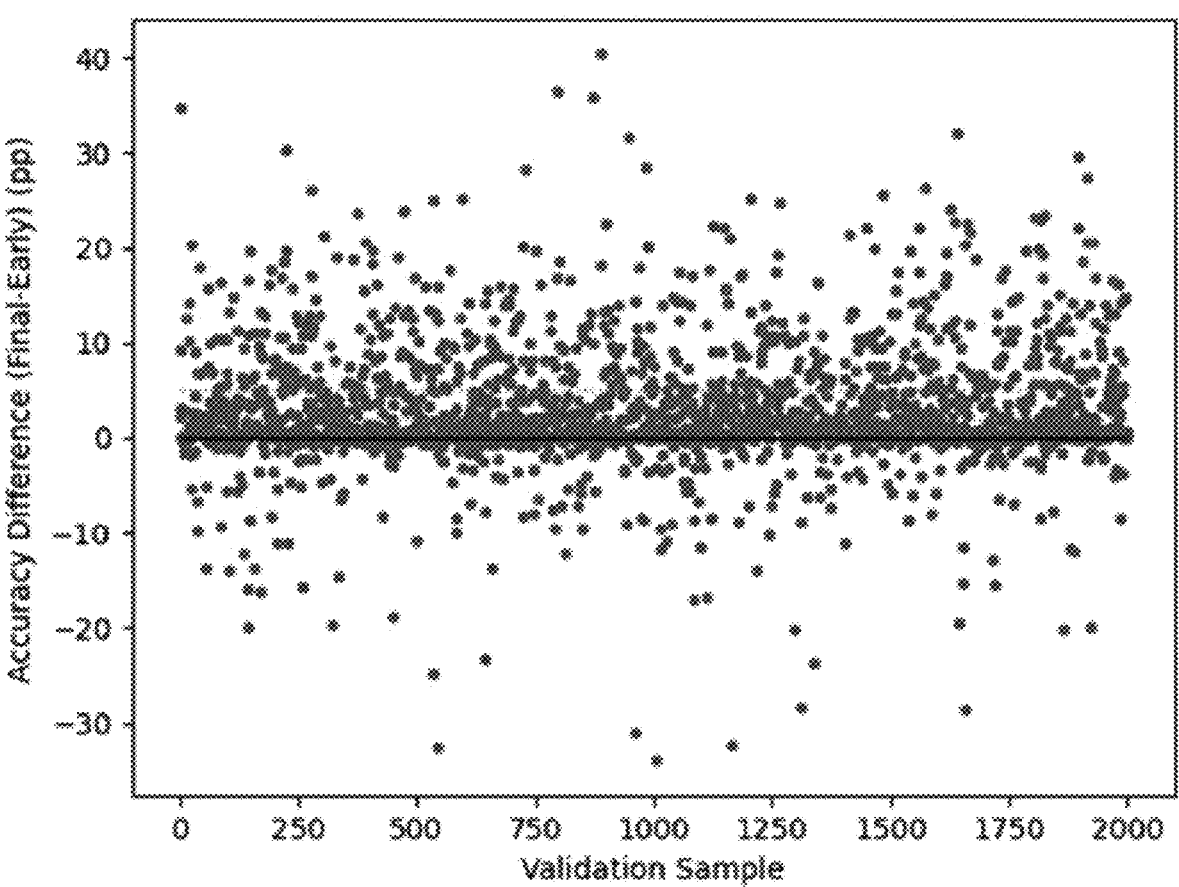
FIG. 6B shows a graph of the difference in accuracy between a prediction made using a final exit point and an early exit point for a plurality of input samples.

FIG. 6A shows an example input image and two predictions made using a final exit point and an early exit point of the model. An input image ("reference") is input into the network, and two segmentation predictions are show, one from the final exit point and one from an early exit point. The Figure also shows a ground truth image. FIG. 6B shows a graph of the difference in accuracy between a prediction made using a final exit point and an early exit point for a plurality of input samples. It is clear that early exits successfully segment a large portion of the input samples. The confidence evaluator is effective at capturing uncertainty on difficult input samples and directs them to deeper exits for further processing.

Figure 7:
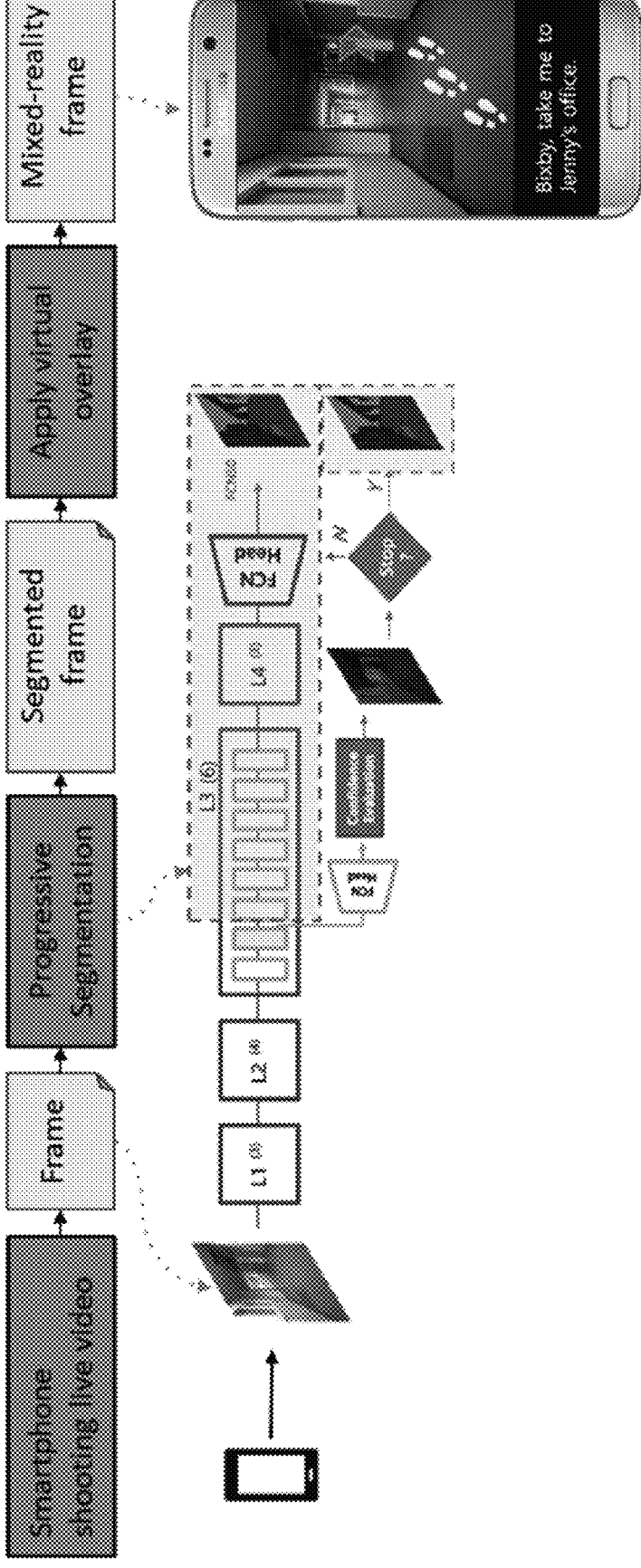
FIG. 7 shows a schematic diagram of a use of the trained model.

FIG. 7 shows a schematic diagram of a use of the trained model. This shows how the image capture device of a smartphone may be used to capture a live video. The video may be of an office or workplace. Frames of the live video may be input into the trained model to be processed by the model using progressive segmentation. A segmented frame may be output by the model, which may, for example, determine that the frame shows walls, doors, floors, windows etc. of the office/workplace. A virtual overlay may be applied over the input frame to generate a mixed-reality frame which uses the information in the segmented frame. For example, this mixed-reality frame may show the user of the smartphone how to get to Jenny's office from the user's current location—this uses the segmentation information to correctly direct the user to an office, because the segmented frame identified the different features of the frame.

Robotic devices may need to employ image segmentation algorithms. This is because robotic devices need to understand their environment, need to construct a 'world' in which they are operating, and need to know the position/location of other actors or agents within their world. There is a need for robustness and low latency so that the robotic devices can make quick and timely decisions. For example, robotic devices may need to be able to avoid obstacles, detect users and other objects such as pets. Thus, robotic devices may implement the trained model of the present techniques to improve their visualisation and understanding.

The trained model of the present techniques may be employed on a diverse range of devices. Advantageously, the early exits allow the model to be customised to suit the capabilities of devices. That is, both the static capabilities of the devices (i.e. the hardware specifications of the devices), and the dynamic capabilities of the devices (i.e. the processing load of the device at the time the model is to be used) may be taken into account to determine whether to use an early exit. Furthermore, the model may be performed entirely on-device or may be split between being performed partly on-device and partly on the cloud, as described in United Kingdom Patent Application No. 2005029.0, which is incorporated by reference herein in its entirety.

FIG. 8 shows a flowchart of example steps to generate a semantic segmentation model and, specifically, to train an overprovisioned network comprising a plurality of candidate early exit segmentation network architectures. The method may comprise: providing a backbone feature extraction network of the ML model with a plurality of early exits in the backbone network, to generate an overprovisioned network comprising a plurality of candidate early exit segmentation network architectures (step S100) wherein each early exit comprises a tailored network architecture; obtaining a training dataset comprising a plurality of images (step S102); and training the backbone network of the ML model, a final exit and the early exits to output feature maps for the plurality of images input into the backbone network, by: training, during a first training stage, the backbone network, the final exit, and the early exits end-to-end (step S104); and freezing weights of the backbone network and the final exit, after the end-to-end training is complete, (step S106) and training, during a second training stage, the early exits individually using the final exit as a teacher for the early exits (step S108).

FIG. 9 shows a flowchart of example steps to generate a sematic segmentation model, and specifically, to search for a specific candidate architecture. The method comprises: receiving a hardware constraint and/or an inference performance requirement (step S200); receiving an inference setting for a specific device or class of devices which will be used to process input images at inference time (step S202); and performing the architecture configuration search using the received hardware constraint and/or inference performance requirement, and the received inference setting to identify an architecture from the plurality of candidate early exit segmentation network architectures that is suitable for a particular application (step S204).

FIG. 10 shows a flowchart of example steps to use a trained model to make semantic segmentation predictions. The method uses a trained machine learning, ML, model which can be configured to have any number of exit points, as described above, depending on the inference setting to be used. Thus, the method may comprise: obtaining an instance of a trained ML model (step S300); receiving an image to be processed by the trained ML model (step S302); and performing, using the instance of the trained ML model, image segmentation on the received image (step S304).

As noted above, at inference time, the network may follow: (i) an anytime inference paradigm, in which a particular exit is selected according the available latency budget, (ii) a progressive inference paradigm in which the network provides an approximation of the output from the first exit and progressively refines it through deeper-exits' predictions, or (iii) an input-dependent inference paradigm in which each sample takes a different computation path according to its difficulty.

Figure 11:
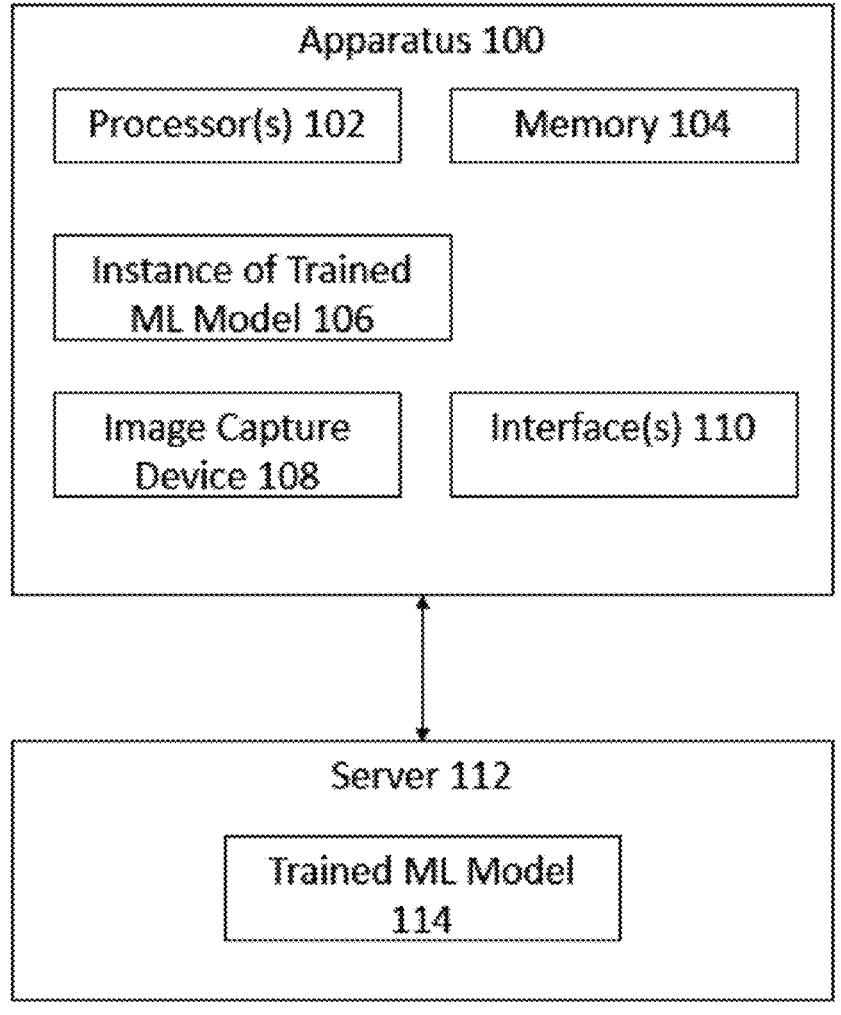
FIG. 11 shows a block diagram of an apparatus for implementing the trained model.

FIG. 11 shows a block diagram of an apparatus 100 for implementing the trained model, and a server 112 for generating the ML model. The server 112 comprises at least one processor coupled to memory (not shown) and arranged to: provide a backbone feature extraction network of the ML model with a plurality of early exits in the backbone network, to generate an overprovisioned network comprising a plurality of candidate early exit segmentation network architectures, wherein each early exit comprises a tailored network architecture; obtain a training dataset comprising a plurality of images; and train the backbone network of the ML model, a final exit and the early exits to output feature maps for the plurality of images input into the backbone network, by: training, during a first training stage, the backbone network, the final exit and the early exits end-to-end; and freezing weights of the backbone network and the final exit, after the end-to-end training is complete, and training, during a second training stage, the early exits individually using the final exit as a teacher for the early exits. The resulting trained ML model 114, comprising a plurality of candidate early exit segmentation network architectures is stored on the server 112.

The apparatus 100 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example devices.

The apparatus 100 comprises an instance of the trained machine learning, ML, model 106 for performing semantic image segmentation.

The apparatus comprises at least one processor 102 coupled to memory 104. The at least one processor 102 may comprise one or more of: a microprocessor, a microcontroller, and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The at least one processor 102 may be arranged to: receive an image to be processed by the trained ML model 106; and perform, using the instance of the trained ML model 106, image segmentation on the received image.

The apparatus may further comprise at least one image capture device 108 for capturing images or videos to be processed by the ML model.

The apparatus may further comprise at least one interface 110 for providing a result of the processing by the ML model to a user of the apparatus. For example, the apparatus 100 may comprise a display screen to receive user inputs and to display the results of implementing the ML model 106 (as shown in the example of FIG. 7).

Figure 12:
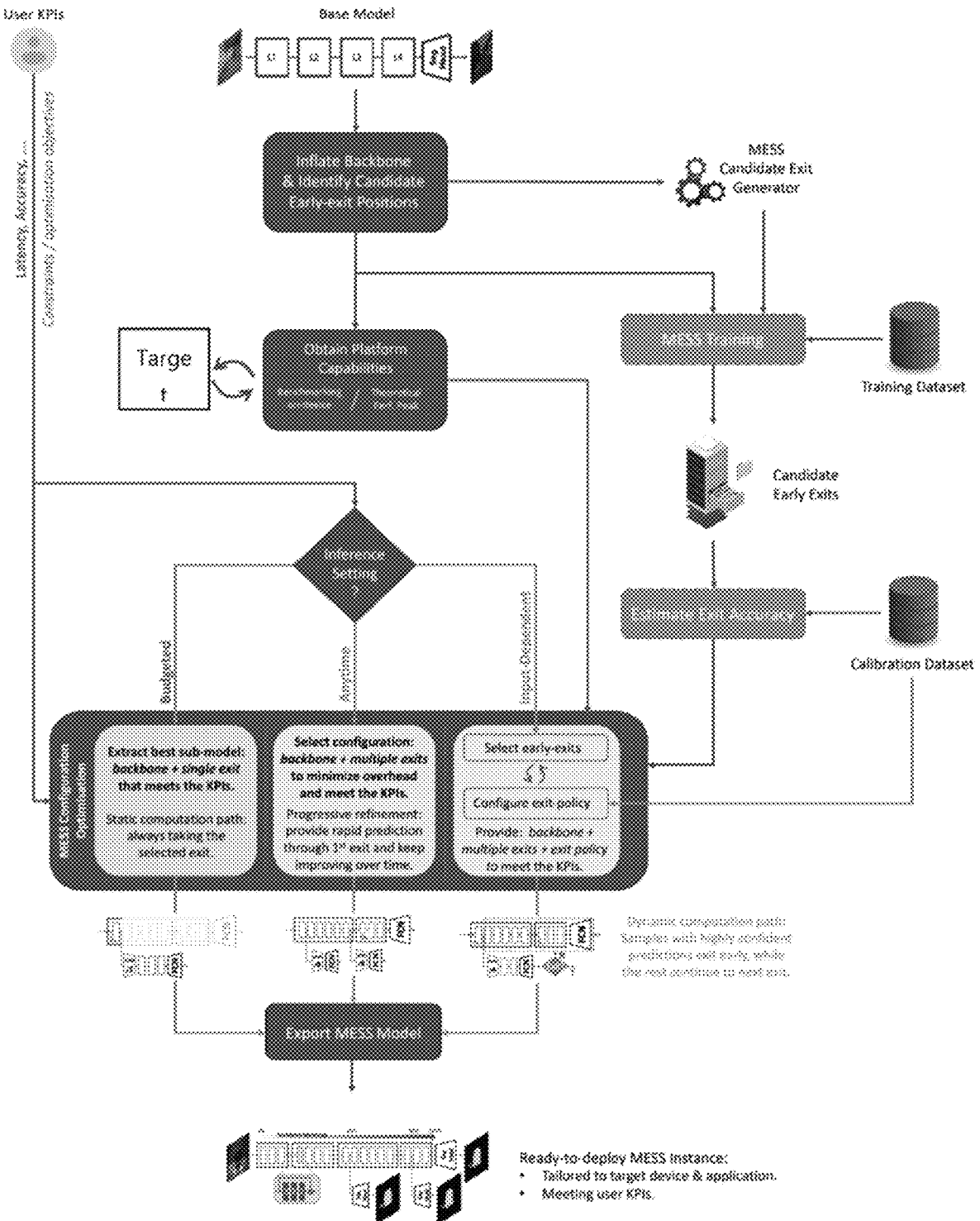
FIG. 12 shows a schematic diagram of the whole process to generate a "train-once, deploy-everywhere" ML model.

FIG. 12 shows a schematic diagram of the whole process to generate a "train-once, deploy-everywhere" ML model. The process starts with a segmentation network, comprising a backbone feature extractor followed by a segmentation head at the end. The backbone is profiled/benchmarked to determine a fixed-granularity set of candidate exit-points along its depth, aiming to distribute them equidistantly in terms of workload/latency. An over-provisioned network is defined by creating multiple different early-exit architectures (neural network layers followed by segmentation heads) and appending all of these in all candidate exit-points. The set of all possible early-exit architectures that are appended to each exit-point is carefully designed and called the search space.

Given a segmentation dataset, the overprovisioned network (backbone and all candidate exits across all exit-points) is trained using the two-stage approach described above and summarised here. First, the backbone network is trained in an exit-aware manner, considering solely a uniform architecture from the search space for each early-point and sequentially dropping all early-exits but one (in a round-robin fashion), updating the backbone weights along with the final exit plus the intermediate early-exit preserved at each iteration. Thereafter, the backbone and final-exit parameters are frozen, and all candidate exit-architectures of the search space, along with all candidate exit points of the overprovisioned network are trained. For this second stage, the Positive Filtering Distillation scheme described above is used, where the final exit's predictions are used to determine the difficulty of each pixel in the training images (according to the final exit's prediction correctness), and only easy pixels (those correctly classified by the final exit) are considered during training the early-exits of the over-provision model.

Post training, numerous variations of MESS networks may be deployed, by cherry-picking some of the trained early-exit architectures of the over-provisioned model. It is possible to pick up to one exit per candidate exit point, but it is not necessary for all exit-points to have an exit appended in all MESS instances. This selection process is called architectural configuration search. The selection process does not involve any training, and happens on the server-side, once, before deploying a MESS network for a given application For the search, a latency/accuracy/energy/memory etc. constraint or requirement (or combination of the above) is provided by the user to the search algorithm, that would co-optimise the number, placement and architecture of all exit-points (out of the search space) needed to meet the user specifications on an optimal way.

The search is also aware of the inference-setting that the model needs to follow during the deployment. This means through what process the deployed MESS instance processes input images at runtime. MESS networks support three inference settings:

(a) Budgeted Inference: where a single early-exit (point and architecture) of the overprovisioned network is selected during search, forming a submodel (comprising part of the backbone up to and including a single early-exit architecture). At inference time, all samples are processed by this submodel, meeting workload, memory, size etc requirements deterministically.

(b) Anytime Inference: where multiple early-exit are used (one per exit point, for multiple exit points). At inference time, sample are processed by each of the selected early-exits sequentially, each offering a segmentation prediction, that is progressively refined/improved over time. Other components of the system or the user can benefit from early-predictions at runtime.

(c) Input-dependent inference: similar to anytime inference, however each exit incorporates a confidence evaluation unit after its output. The network's exits process each sample sequentially, and after each prediction, the confidence evaluator will determine if the current image requires further processing (by subsequent exits), or can terminate its computation, already offering a confident-enough prediction, at image level (not per-pixel). Confidence tries to capture the notion of difficulty for an image to be segmented, allowing easy samples to exit-early, spending the "right amount of computation" on each input sample, at runtime.

For input-dependent inference, a novel confidence metric is proposed, tailored for semantic segmentation. Instead of naively averaging the per-pixel confidence values provided by the network to obtain a per-image confidence value for each prediction, the confidence metric instead considers the percentage of pixels in an image that rise above a given confidence level. Moreover, the contribution of each pixel are differently weighted to this metric, i.e. pixels close to semantic edges that are naturally over-confident are downgraded. For the case of input-dependent inference, the exit-policy (thresholds for each exit) are co-optimised by the search algorithm, along with the number, placement and configuration of exits.

When a new deployment scenario is needed (e.g. deploy a model to a different device, or for an application with stricter latency constraint) a new search is required on top of the already trained over-provisioned model, avoiding the need to re-train the model. This makes the proposed methodology a "train-once-deploy-everywhere" approach to semantic segmentation. Training and search happens on the server-side, whereas deployment can target different devices with varying compute capabilities.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for generating a machine learning (ML), model for semantic image segmentation, the method comprising:

providing a backbone feature extraction network of the ML model with a plurality of early exits in the backbone network, to generate a network comprising a plurality of candidate early exit segmentation network architectures, wherein each of the plurality of early exits comprises a network architecture tailor-made for a semantic segmentation task performed by the respective early exit;

obtaining a training dataset comprising a plurality of images; and training the backbone network of the ML model, a final exit and the early exits to output feature maps for the plurality of images input into the backbone network, by:

Training during a first training stage, the backbone network, the final exit and the early exits end-to-end; and freezing weights of the backbone network and the final exit, after the end-to-end training is complete, and training, during a second training stage, the early exits individually using the final exit as a teacher for the early exits.

2. The method as claimed in claim 1 wherein the first training stage comprises iteratively training the backbone network and early exits, wherein during each iteration the training comprises:

selecting one early exit of the plurality of early exits to be updated;

dropping-out an early exit of the remainder of the early exits; and training the backbone network and the selected early exit and updating weights of the backbone network and selected early exit.

3. The method as claimed in claim 1, wherein the second training stage comprises:

determining, using a segmentation prediction made for an image by the final exit, a difficulty of each pixel in the image based on whether the prediction for each pixel is correct; and training the early exits using only the pixels for which the prediction is correct.

4. The method as claimed in claim 1, further comprising performing architecture configuration search to identify an architecture from the plurality of candidate early exit segmentation network architectures that is suitable for a particular application.

5. The method as claimed in claim 1, wherein the first training stage comprises updating the weights of the backbone network and one early exit of the early exits, at each iteration, while the remainder of the early exits are dropped-out in a round-robin fashion.

6. The method as claimed in claim 1, wherein the second training stage wherein the freezing weights of the backbone network and the final exit comprises not updating first weight of the backbone network and second weights of the final exit while the early exits are trained independently.

7. The method as claimed in claim 2 wherein for each selected early exit, the remainder of the early exits are sequentially dropped-out during each iteration of training the selected early exit.

8. The method as claimed in claim 4 further comprising:

receiving a hardware constraint or an inference performance requirement;

receiving an inference setting for a specific device or class of devices which will be used to process input images at inference time; and performing the architecture configuration search using the received hardware constraint or inference performance requirement, and the received inference setting.

9. The method as claimed in claim 8 wherein the received inference setting is a budgeted inference setting, and wherein the architecture configuration search outputs an architecture which comprises a backbone feature extraction network and a single early exit.

10. The method as claimed in claim 8 wherein the received inference setting is an anytime inference setting, and wherein the architecture configuration search outputs an architecture which comprises a backbone feature extraction network and multiple early exits.

11. The method as claimed in claim 8 wherein the received inference setting is an input dependent inference setting, wherein the architecture configuration search outputs an architecture which comprises a backbone feature extraction network and multiple early exits, and wherein the architecture comprises a confidence evaluation unit associated with each early exit to evaluate, at inference time, a confidence of a prediction made by each early exit.

12. The method as claimed in claim 11 wherein the confidence evaluation unit for each early exit is configured to:

calculate a confidence value of the image segmentation prediction made by the associated early exit for the image as a whole;

determine whether the confidence value is greater than or equal to a threshold confidence value; and instruct the processing to continue to a subsequent early exit when the confidence value is below the threshold confidence value, or instruct the processing to terminate when the confidence value is greater than or equal to the threshold confidence value.

13. The method as claimed in claim 12 wherein calculating a confidence value for the image as a whole comprises:

obtaining a per-pixel confidence map comprising confidence values for each pixel of the image;

identifying pixels located close to semantic edges of objects within the prediction; and outputting a percentage value of pixels in the image which have a per-pixel confidence value greater than or equal to the threshold confidence values, wherein contributions of the identified pixels are downgraded.

14. The method as claimed in claim 13 wherein the threshold confidence value is optimized for each early exit during the architecture configuration search.

15. A computer-implemented method for using a trained machine learning (ML) learning, ML, model for semantic image segmentation on a device, the method comprising:

obtaining an instance of a trained ML model, the instance being an early exit segmentation network architecture associated with the device or a class of devices to which the device belongs and suitable for an inference setting used by the device;

receiving an image to be processed by the instance of the trained ML model; and performing, using the instance of the trained ML model, image segmentation on the received image, wherein the instance of a trained ML model is obtained in a two stage training process comprising a first training stage in which a backbone feature extraction network and exits including one or more early exits and a final exit are trained together, and a second training stage in which weights of the backbone feature extraction network and the final exit is frozen, and the one or more early exits are trained independently.

16. The method as claimed in claim 15 wherein when the early exit segmentation network architecture comprises a single early exit, performing image segmentation comprises outputting an image segmentation prediction from the single early exit.

17. The method as claimed in claim 15 wherein the early exit segmentation network architecture comprises a plurality of early exits, and a confidence evaluation unit associated with each of the plurality of early exits, wherein the confidence evaluation unit for each of the plurality of early exits is configured to:

obtain a per-pixel confidence map comprising confidence values for each pixel of the image;

identify pixels located close to semantic edges of objects within the prediction; and generate a confidence value for the image as a whole, wherein the confidence value is a percentage value of pixels in the image which have a per-pixel confidence value greater than or equal to a threshold confidence value associated with the early exit, wherein contributions of the identified pixels are downgraded.

* * * * *